US012651066B2

(12) United States Patent
Martinic

(10) Patent No.: US 12,651,066 B2
(45) Date of Patent: Jun. 9, 2026

(54) RANSOMWARE MITIGATION SYSTEM AND METHOD FOR MITIGATING A RANSOMWARE ATTACK

(71) Applicant: Christopher Martinic, Cherrybrook (AU)

(72) Inventor: Christopher Martinic, Cherrybrook (AU)

( * ) Notice: Subject to any disclaimer, the term of this patent is extended or adjusted under 35 U.S.C. 154(b) by 196 days.

(21) Appl. No.: 18/201,654

(22) Filed: May 24, 2023

(65) Prior Publication Data

US 2023/0297678 A1     Sep. 21, 2023

Related U.S. Application Data

(63) Continuation of application No. PCT/AU2021/051399, filed on Nov. 24, 2021.

(30) Foreign Application Priority Data

Nov. 24, 2020    (AU) ................................ 2020904351

(51) Int. Cl.
*G06F 21/56*        (2013.01)
*G06F 21/55*        (2013.01)
(52) U.S. Cl.
CPC .......... *G06F 21/568* (2013.01); *G06F 21/554* (2013.01)
(58) Field of Classification Search
CPC .. G06F 21/568; G06F 21/554; G06F 21/1082; G06F 2201/81; G06F 2201/835;
(Continued)

(56) References Cited

U.S. PATENT DOCUMENTS 5,751,950 A * 5/1998 Crisan ..................... G06F 21/57
714/24
8,910,238 B2 * 12/2014 Lukacs ................... G06F 21/53
713/168
(Continued)

OTHER PUBLICATIONS

CryptoLock_and_Drop_It_Stopping_Ransomware_Attacks_on_ User_Data (Year: 2016).*
(Continued)

*Primary Examiner* — Philip J Chea
*Assistant Examiner* — Jasmine Mochen Day
(74) *Attorney, Agent, or Firm* — Myers Wolin, LLC

(57) ABSTRACT

A ransomware mitigation system and corresponding methods are provided. The ransomware mitigation system monitors the rate of modification of files on computing devices to determine whether the monitored rate of modifications exceeds a predetermined threshold. If the threshold is exceeded, then the ransomware mitigation system actuates a forced shutdown of the computing device and/or a forced disconnection of the network connection to the computing device. The ransomware mitigation system includes a software monitoring portion as well as a hardware switching unit. The software monitoring portion is in synchronous bidirectional communication with the hardware switching unit on a separate network. If the software monitoring portion is shutdown then the hardware unit actuates the shutdown and/or disconnection of the computing device(s). The hardware unit includes a hardware lock that requires physical presence of a person to allow for maintenance.

19 Claims, 17 Drawing Sheets

(58) Field of Classification Search
CPC .......... G06F 11/3006; G06F 2201/865; G06F 17/40; G06F 2221/034; G06F 2221/2125; G06F 2221/2153; G06F 21/565; G06F 21/6218; G06F 21/81; G06F 21/123; G06N 3/045; G06N 3/08; G06N 3/02; G06N 20/00; H04L 63/1425; H04L 63/145

See application file for complete search history.

(56) References Cited

U.S. PATENT DOCUMENTS

| | | | | |
|---|---|---|---|---|
| 9,888,032 | B2 * | 2/2018 | Dekel | G06F 21/60 |
| 10,311,234 | B2 * | 6/2019 | Bhashkar | G06F 21/568 |
| 10,503,904 | B1 * | 12/2019 | Singh | G06F 21/566 |
| 10,607,009 | B2 * | 3/2020 | Dahan | G06F 21/568 |
| 10,831,893 | B2 * | 11/2020 | Schmugar | G06F 21/554 |
| 2016/0219024 | A1 | 7/2016 | Verzun et al. | |
| 2016/0378988 | A1 | 12/2016 | Bhashkar et al. | |
| 2017/0148018 | A1 | 5/2017 | Levin | |
| 2017/0366563 | A1 * | 12/2017 | Volfman | H04L 63/1416 |
| 2018/0018458 | A1 | 1/2018 | Schmugar et al. | |
| 2018/0062764 | A1 | 3/2018 | Borrill | |
| 2018/0075239 | A1 * | 3/2018 | Boutnaru | G06F 21/60 |
| 2018/0101678 | A1 * | 4/2018 | Rosa | G06F 3/0622 |
| 2018/0115577 | A1 * | 4/2018 | Shukla | G06F 21/55 |
| 2018/0293379 | A1 | 10/2018 | Dahan | |
| 2018/0375826 | A1 * | 12/2018 | Chang | G06F 3/065 |
| 2020/0097653 | A1 * | 3/2020 | Mehta | G06F 21/56 |
| 2020/0159624 | A1 * | 5/2020 | Malkov | G06N 20/00 |

OTHER PUBLICATIONS

Ransomware Detection And Mitigation Tool (Year: 2017).*
Design_simulation_and_implementation_of_bidirectional_converter_using_synchronous_switching (Year: 2017).*
International Search Report issued for International Patent Application No. PCT/AU2021/051399 mailed on Dec. 14, 2021.

* cited by examiner

1230

1200

1235

1225

1215

1210

1220

1205

Driver

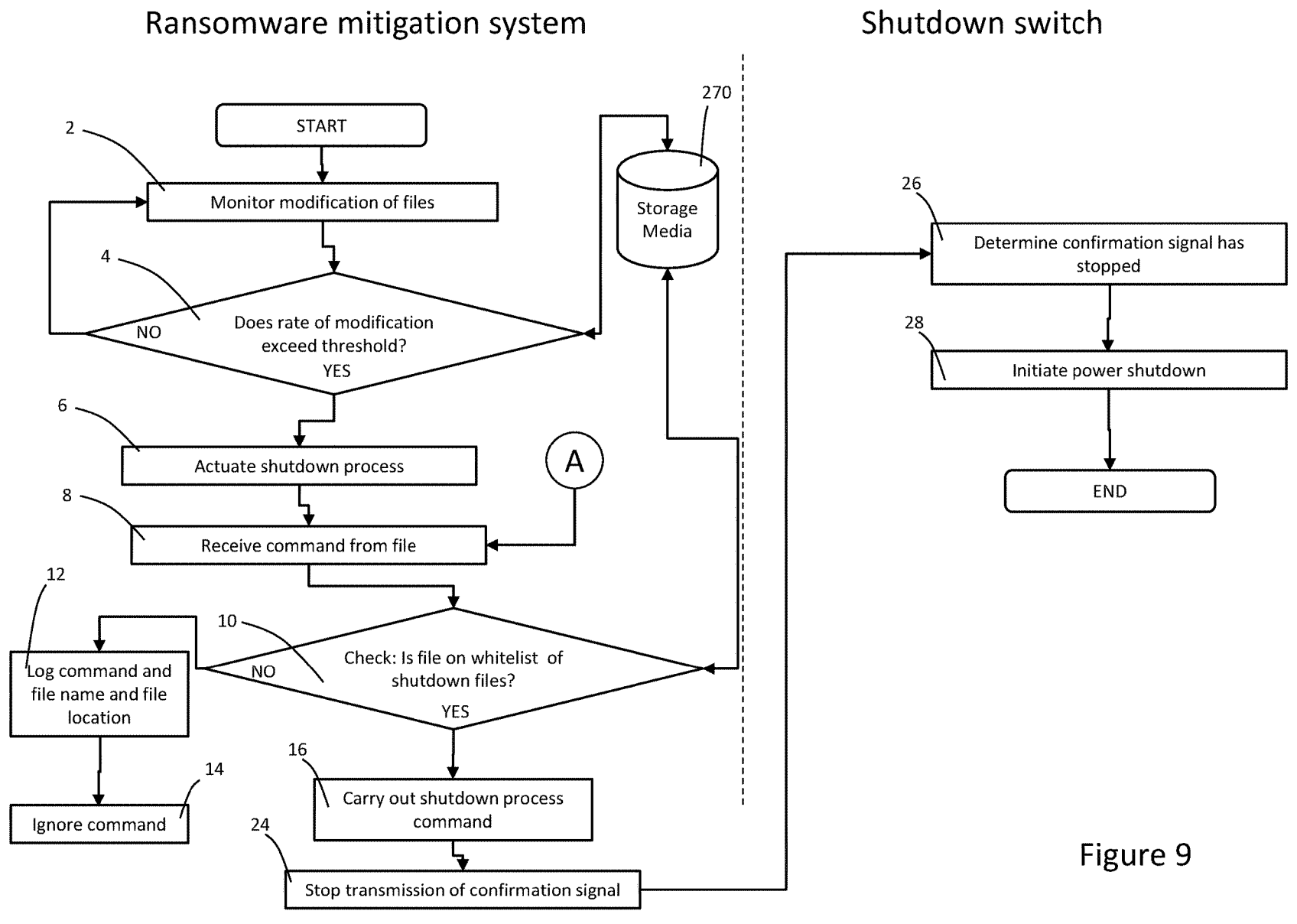

Shutdown switch

26 — Determine confirmation signal has stopped

28 — Initiate power shutdown

END

Ransomware mitigation system

270 — Storage Media

START

2 — Monitor modification of files

4 — Does rate of modification exceed threshold?    NO / YES

6 — Actuate shutdown process

A

8 — Receive command from file

10 — Check: Is file on whitelist of shutdown files?    NO / YES

12 — Log command and file name and file location

14 — Ignore command

16 — Carry out shutdown process command

24 — Stop transmission of confirmation signal

Figure 9

RANSOMWARE MITIGATION SYSTEM AND METHOD FOR MITIGATING A RANSOMWARE ATTACK

CROSS-REFERENCE TO RELATED APPLICATION

This application is a continuation under 35 U.S.C. § 120 of International Application PCT/AU2021/051399, filed Nov. 24, 2021, which claims priority to Australian Application No. 2020904351, filed Nov. 24, 2020, the contents of each of which are incorporated by reference herein.

FIELD OF THE INVENTION

The present invention relates to a ransomware and malicious intrusion mitigation system and in particular to a mitigation system for at least partially reducing the negative consequences of a ransomware attack or a similar malicious intrusion.

The invention has been developed primarily for use in/with ransomware attack scenarios and will be described hereinafter with reference to this application. However, it will be appreciated that the invention is not limited to this particular field of use, and could be used to protect computerised devices from other similar malicious intrusions such as for purposes of cyber espionage, cyber sabotage and intellectual property theft.

BACKGROUND OF THE INVENTION

Ransomware is well known as a type of computer virus that infiltrates a network and encrypts files on that network. A ransomware attack may also take the form of a malicious person or hacker gaining secure access to the computer(s) and attached networks of a person or organization and through a series of commands, manually encrypt target files throughout the network enterprise. Therefore, antivirus protection on its own is not enough to prevent ransomware attacks. Once sufficient files have been encrypted, the malicious code or bad actor makes its presence known and demands a ransom for decrypting the files that have been encrypted. Ransomware is becoming an increasingly large threat to society and also to industry. Increasing numbers of large corporations have come under attack, especially by ransomware, forcing the companies to either pay out the ransom demanded, or to wipe the drives of the infected computers and reinstall the applications on which business is done. This may result in a loss of very important commercial information where the information is stored on those computers. Where backups have been made, not all of the information may be lost, but new information from when the information was last backed up may be lost. The information lost could be information from the previous day, a few previous days or week or even a month, depending on how often backups are carried out. Furthermore, ransomware attacks have become increasingly complex, wherein the ransomware code allows the backed up information also to be located throughout the network enterprise and encrypted.

One of the issues with ransomware is that intruders may find their way into a network or computer using a username and password that has been stolen from a legitimate user of that computer or network. Furthermore, known or unknown vulnerabilities in an organisation's or user's computer operating systems, network infrastructure hardware or software may allow malicious access to the user's network enterprise with or without valid user credentials.

This means that the ransomware or intruder using ransomware encryption tools will be allowed access to the computer or network, regardless of the amount of security provided by passwords.

Some attempts have been made to overcome the issues presented by ransomware by backing up information that could be encrypted by the ransomware once it has been detected. For example US 2016/0378988 by Bashkar et al describes an anti-ransomware system that identifies multiple files that have been opened with write permission, and then creates a backup copy of each of the corresponding open files. It then determines whether the frequency of opening of the files is higher than a threshold amount. If the frequency of opening of the files is beyond the threshold amount, it provides the ability for a user to recover any of the files that have been potentially encrypted based on the corresponding backup copy. However, using this system the backup copies may also be encrypted by the ransomware, and the software may not be able to seize control of the files at risk, away from the ransomware process to back them up and prevent their encryption or destruction. This system and other antivirus systems rely on the termination of the ransomware process using machine instructions, however ransomware may be coded to restart its own processes when shut down or coded to prevent shutdown.

Many varieties of ransomware can be found, and any reference to the term "ransomware" in this specification should be regarded as a reference to any form of malicious intrusion, including for example, for sabotage, industrial espionage, intellectual property theft, and the like.

Any reference in this specification to the monitoring of the "modification" and/or "rate of modification" of any one or more digital files shall include, but not be limited to the monitoring of any one or more selected from the read timestamp, accessed timestamp, modified timestamps, and deleted files of any digital file or files. The monitoring may be by accessing the file record of the digital files, by monitoring the digital files themselves, or by any other means. Also included in the reference to monitoring of modification of files and/or access patterns includes the monitoring of access patterns, where access patterns shall be construed to include, but not be limited to any one or more selected from monitoring of reading and/or modification and/or deletion of file timestamps, file type access; deletion rates of files; amount of network traffic for a given time of day; total network bandwidth and/or traffic; machine learning and/or artificial intelligence (AI) trained recognition of unusual access patterns; comparison of access patterns to established patterns for a given time/date, number of user types (such as administrators); number of current users; or any other suitable metric.

Any discussion of the background art throughout the specification should in no way be considered as an admission that such background art is prior art, nor that such background art is widely known or forms part of the common general knowledge in the field in Australia or any other country.

SUMMARY OF THE INVENTION

The invention seeks to provide a ransomware protection system and method of mitigating a ransomware attack which will overcome or substantially ameliorate at least some of the deficiencies of the prior art, or to at least provide an alternative.

According to a first aspect, the present invention may be said to consist in a ransomware mitigation system for mitigating damage done to one or more computing devices on a network connection from a ransomware attack, the ransomware mitigation system comprising:

a. digital storage media configured for storing data and/or instructions;

b. a processor operationally connected to the digital storage media and configured to be directed by instructions; and c. a monitoring transceiver operably connected to the processor for transmitting and/or receiving digital information;

d. wherein the processor is configured to be guided by the instructions to carry out the steps of:

i. monitoring a plurality of digital files for the rate of modifications carried out on the plurality of digital files;

ii. determining whether the monitored rate of modifications meets a predetermined activity threshold; and iii. actuating one or more selected from:

1. a forced shutdown of the one or more computing devices; and 2. a forced disconnection of the network connection of the one or more computing devices.

In one embodiment, the processor is configured to be guided by the instructions to carry out the step of:

a. actuating a forced shutdown of the one or more computing devices by actuating a command at machine code level in the one or more computing devices.

In one embodiment, the processor is configured to be guided by the instructions to carry out the step of:

a. actuating a forced shutdown of the one or more computing devices by actuating a command at machine code level in the one or more computing devices that cannot be countermanded or terminated, even at administrator level.

In one embodiment, the processor is configured to be guided by the instructions to carry out the step of:

a. actuating a forced shutdown of the one or more computing devices by actuating a command at machine code level in the one or more computing devices, causing the one or more computing devices to cease all other processes except shutdown processes.

In one embodiment, the processor is configured to be guided by the instructions to carry out the step of:

a. allocating a whitelist of shutdown files that are part of the shutdown process and only allowing whitelisted shutdown files to operate on actuation of the forced shutdown.

In one embodiment, the processor is configured to be guided by the instructions to carry out the step of:

a. preventing modification of the whitelisted files during the forced shutdown of the one or more computing devices.

In one embodiment, the processor is configured to be guided by the instructions to carry out the step of:

a. creating a locked backup copy of whitelisted files.

In one embodiment, the backup copies of the white listed files are encrypted.

In one embodiment, the processor is configured to be guided by the instructions to carry out the step of:

a. restoring whitelisted files from the locked backup copy in the event that a whitelisted file is modified or deleted.

In one embodiment, the processor is configured to be guided by the instructions to carry out the step of:

a. actuating a forced shutdown of the one or more computing devices by actuating one or more shutdown switches, wherein actuation of the shutdown switch shuts off power to at least one or more of the one or more computing devices.

In one embodiment, the processor is configured to be guided by the instructions to carry out the step of:

a. executing white listed files from locked copies of the white listed files.

In one embodiment, the processor is configured to be guided by the instructions to carry out the step of:

a. actuating a forced shutdown of one or more communications devices in a network connecting the one or more computing devices by actuating at least one or more shutdown switches, wherein actuation of the at least one or more shutdown switches shuts off power to at least one or more of the one or more communications devices.

In one embodiment, the at least one or more communication devices includes a router.

In one embodiment, the shutdown switch is a virtual shutdown switch.

In one embodiment, the shutdown switch is a hardware shutdown switch.

In one embodiment, the hardware shutdown switch is electromechanical in nature.

In one embodiment, the hardware shutdown switch is electronic in nature.

In one embodiment, the processor is configured to be guided by the instructions to carry out the step of:

a. logging out all users on the one or more computing devices.

In one embodiment, the processor is configured to be guided by the instructions to carry out the step of:

a. monitoring at least the modified file timestamp present on the file record of at least one or more digital files for the rate of modifications of the modified file timestamp present on the file record of the at least one or more digital files.

In one embodiment, the processor is configured to be guided by the instructions to carry out the step of:

a. monitoring the read, accessed and modified timestamps as well as deleted files (i.e. hitherto referred to as file system modifications) present on the file record of at least one or more digital files for the rate or pattern of modifications to the file system of at least one or more digital files.

In one embodiment, the ransomware protection system includes a shutdown switch actuatable by the processor.

In one embodiment, the processor is configured to be guided by the instructions to carry out the step of:

a. determining whether the total number of modifications meets a predetermined activity threshold.

In one embodiment, the processor is configured to be guided by the instructions to carry out the step of:

a. determining whether the total number of modifications corresponds to an filesystem access pattern.

In one embodiment, the processor is configured to be guided by the instructions to carry out the step of:

a. allocating a weighting to one or more selected from i. the monitored rate of modifications;

ii. the total number of modifications; and iii. the type of filesystem access pattern.

In one embodiment, the processor is configured to be guided by the instructions to carry out the step of:

a. creating a backup copy of the files being modified.

In one embodiment, the processor is configured to be guided by the instructions to carry out the step of:

a. creating a backup copy of critical operating system and executable files necessary for enforced shutdown and instigating software system protection against modification of these files from all users including those at administrator level.

In one embodiment, the processor is configured to be guided by the instructions to carry out the step of:

a. generating an alert signal in response to the rate of modifications exceeding a predetermined threshold.

In one embodiment, the processor is configured to be guided by the instructions to carry out the step of:

a. determining the network location of the computing devices on which the rate of file modification has exceeded the threshold (the "affected computing devices").

In one embodiment, the ransomware mitigation system can include at least one or more shutdown switches.

In one embodiment, the ransomware mitigation system can include a plurality of shutdown switches.

In one embodiment, the ransomware mitigation system includes a database of computing devices being monitored, together with their network location.

In one embodiment, the ransomware mitigation system includes a database of shutdown switches.

In one embodiment, each shutdown switch is associated with one or more computing devices being monitored.

In one embodiment, each shutdown switch is associated with one or more computing devices being monitored, the shutdown switch being configured for cutting power to at least one or more of its associated computing devices.

Network Portion Shutdown

In one embodiment, the processor is configured to be guided by the instructions to carry out the step of:

a. actuating the disconnection of the network connection.

In one embodiment, the processor is configured to be guided by the instructions to carry out the step of:

a. actuating the physical disconnection of the network connection.

In one embodiment, the processor is configured to be guided by the instructions to carry out the step of:

a. actuating the virtual disconnection of the network connection.

In one embodiment, the processor is configured to be guided by the instructions to carry out the step of:

a. determining which shutdown switches are associated with the affected computing devices.

In one embodiment, the processor is configured to be guided by the instructions to carry out the step of:

a. actuating the shutdown of switches associated with the affected computing devices to shut power to the affected devices.

In one embodiment, the processor is configured to be guided by the instructions to carry out the step of:

a. detecting tampering on the ransomware mitigation system files.

In one embodiment, the processor is configured to be guided by the instructions to carry out the step of:

a. detecting tampering on ransomware mitigation system communications processes with one or more selected from i. one or more electromechnical switches, ii. one or more hardware locks; and iii. peripheral hardware.

In one embodiment, the peripheral hardware includes hardware dongle is and/or USB devices.

In one embodiment, the processor is configured to be guided by the instructions to carry out the step of:

a. actuating the shutdown of power to all of the computing devices being monitored by the ransomware mitigation system files in the event of the detection of tampering on one or more selected from the ransomware mitigation system files and/or ransomware mitigation system communications processes.

In one embodiment, the processor is configured to be guided by the instructions to carry out the step of:

a. disabling the operating system of the one or more computing devices by forced exception interrupt processing.

In one embodiment, the processor is configured to be guided by the instructions to carry out the step of:

a. disabling the operating system of the one or more computing devices by forced exception interrupt processing leading to an operating system halt where no shutdown software facility exists or power cannot be interrupted.

Hardware Lock

In one embodiment, the ransomware mitigation system includes a hardware lock.

In one embodiment, the hardware lock is one or more selected from:

a. a hardware dongle;

b. a USB device;

c. an add-in board.

In one embodiment, the hardware lock includes is a device that can be inserted into a standard computer port, such as a USB port or plugged into a network or computer BUS system.

In one embodiment, the hardware lock is configured for manual manipulation.

In one embodiment, the hardware lock is configured for manual manipulation for purposes of maintenance or administration of the ransomware mitigation system.

In one embodiment, the hardware lock is configured for being operated by a hardware key.

In one embodiment, the hardware key is a mechanical key-switch.

In one embodiment, the hardware lock is reconfigurable between a. an unlocked condition; and b. a locked condition.

In one embodiment, the processor is configured to be guided by the instructions to carry out the step of:

a. receiving a request for modification of the system files of the ransomware mitigation system;

b. determining whether the hardware lock is in its unlocked condition; and c. only allowing the processing of the request for modification of the system files of the ransomware mitigation system in the event that the hardware lock is in its unlocked condition.

Machine Learning

In one embodiment, the processor is configured to be guided by the instructions to carry out the step of:

a. utilising an artificial intelligence (AI) model to establish the predetermined threshold.

In one embodiment, the AI model is based on one or more selected from machine learning, deep learning and neural networks.

In one embodiment, the processor is configured to be guided by the instructions to carry out the step of:

a. training an artificial intelligence on previous data of the modification of files in order to generate the AI model.

In one embodiment, the processor is configured to be guided by the instructions to carry out the step of:

a. training the AI model on historical data from the one or more computing devices including one or more selected from:

i. number of users;

ii. time of day;

iii. rate of modifications;

iv. total number of modifications of files in a single process;

v. local intrusion attempts;

vi. connecting internet protocol (IP) addresses;

vii. originating communication locations;

viii. emerging risk management data from online resources; and ix. any other suitable data.

In one embodiment, the ransomware mitigation system is installed on one or more selected from a web server, server system and a client computing device.

Shutdown Switch

In one embodiment, the shutdown switch includes an electrical circuit.

In one embodiment, the shutdown switch includes a receiver.

In one embodiment, the shutdown switch includes a transceiver.

In one embodiment, the shutdown switch includes a shutdown switch transceiver configured for communicating with one or more selected from the monitoring device transceiver and with one or more shutdown switch transceivers on other similar shutdown switches.

In one embodiment, the shutdown switch transceiver is configured for communicating with one or more selected from the monitoring device transceiver and with one or more shutdown switch transceivers on other similar shutdown switches on a network independent of the network that the computing devices are connected to.

In one embodiment, the receiver is a wireless receiver.

In one embodiment, the receiver is configured for receiving an actuation signal from a remote terminal.

In one embodiment, the shutdown switch is configured to open and/or close one or more electrical circuits to effect an electrical shutdown of the monitored computing devices on receiving an actuation signal.

In one embodiment, the receiver is configured for receiving a confirmation signal at regular intervals from a monitoring terminal.

In one embodiment, the shutdown switch includes a controller directed by monitoring software for monitoring the received confirmation signal.

In one embodiment, the transceiver is configured to generate synchronised confirmation signals to transmit to the remote terminal.

In one embodiment, the generation of the synchronised confirmation signal is controlled independently independent of the monitoring software.

In one embodiment, the shutdown switch is configured for communicating mutually with a remote monitoring terminal using a bidirectional time synchronised confirmation signal.

In one embodiment, the remote terminal is a monitoring terminal.

In one embodiment, the monitoring terminal may be a computing device.

In one embodiment, the receiver is configured for receiving a confirmation signal from a remote terminal at regular intervals.

In one embodiment, the confirmation signal is encrypted.

In one embodiment, the confirmation signal is synchronised.

In one embodiment, the shutdown switch is configured for opening and/or closing the electrical circuit to shut off and/or prevent network communications with the computing devices being protected in the event that a confirmation signal is not received at an expected interval.

In one embodiment, the receiver is configured for receiving a confirmation signal continuously.

In one embodiment, the receiver is configured for receiving a confirmation signal from a remote terminal continuously.

In one embodiment, the shutdown switch is configured for opening and/or closing the electrical circuit in the event that a confirmation signal is not received continuously.

In one embodiment, the shutdown switch includes a switch processor.

In one embodiment, the shutdown switch includes switch digital storage media configured for storing one or more selected from data and software instructions.

In one embodiment, the switch processor is configured for being directed by the switch software instructions to open and/or close the electrical circuit at a switching device.

In one embodiment, the switch processor is configured for being directed by the switch software instructions to actuate a driver to open and/or close the electrical circuit at a switching device.

In one embodiment, the switching device includes a mechanical key-switch.

In one embodiment, the switching device includes an over centre switch.

In one embodiment, the switching device includes a solenoid that is operable by the switch processor to open and/or close the mechanical key-switch.

In one embodiment, the switching device includes a reset switch for closing and/or opening the electrical circuit.

In one embodiment, the switching device includes a reset switch which is configured to be manually manipulated to close and/or open the electrical circuit.

In one embodiment, the switching device includes a reset switch which is configured to electrically close and/or open the electrical circuit.

In one embodiment, the shutdown switch is configured for receiving a confirmation signal from the ransomware mitigation system.

In one embodiment, the shutdown switch is configured for receiving a confirmation signal from the ransomware mitigation system at regular intervals.

In one embodiment, the shutdown switch is configured for continuously receiving a confirmation signal from the ransomware mitigation system.

In one embodiment, the shutdown switch is configured for opening and/or closing the electrical circuit at a switching device in the event that a confirmation signal is not received from the ransomware mitigation system.

In one embodiment, the shutdown switch is configured for opening and/or closing the electrical circuit at a switching device in the event that a confirmation signal is not received from the ransomware mitigation system at a regular interval.

In one embodiment, the shutdown switch includes a plug socket for connecting electrical power to a computing device.

In one embodiment, the shutdown switch is configured for sending an actuation signal to actuate the provision of electrical power to a backup computing device.

In one embodiment, the shutdown switch is configured for sending an actuation signal to actuate the connection of backup computing devices to a network.

According to a further aspect, the invention may be said to consist in a method of mitigating damage done to one or more computing devices from a ransomware attack, the method being carried out on an electronic device and comprising the steps of:

a. monitoring a plurality of digital files for the rate of modifications carried out on the plurality of digital files;

b. determining whether the monitored rate of modifications meets a predetermined activity threshold; and c. actuating one or more selected from:

i. a forced shutdown of the one or more computing devices; and ii. a forced disconnection of the network connection of the one or more computing devices.

In one embodiment, the step of actuating a forced shutdown includes the step of:

a. actuating a forced shutdown of the one or more computing devices by actuating a command at machine code level in the one or more computing devices.

In one embodiment, the step of actuating a forced shutdown includes the step of:

a. actuating a forced shutdown of the one or more computing devices by actuating a command at machine code level in the one or more computing devices that cannot be countermanded and/or terminated, even at administrator level.

In one embodiment, the step of actuating a forced shutdown includes the step of:

a. actuating a forced shutdown of the one or more computing devices by actuating a command at machine code level in the one or more computing devices, causing the one or more computing devices to cease all other processes except shutdown processes.

In one embodiment, the step of actuating a forced shutdown includes the step of:

a. allocating a whitelist of shutdown files that are part of the shutdown process and only allowing whitelisted shutdown files to operate on actuation of the forced shutdown.

In one embodiment, the step of actuating a forced shutdown includes the step of:

a. preventing modification of the whitelisted files during the forced shutdown of the one or more computing devices.

In one embodiment, the step of actuating a forced shutdown includes the step of:

a. creating a locked backup copy of whitelisted files.

In one embodiment, the step of backing up the white listed files includes the step of encrypting the white listed files.

In one embodiment, the step of actuating a forced shutdown includes the step of:

a. restoring whitelisted files from the locked backup copy in the event that a whitelisted file is modified.

In one embodiment, the step of actuating a forced shutdown includes the step of:

a. actuating a forced shutdown of the one or more computing devices by actuating one or more shutdown switches, wherein actuation of the shutdown switch shuts off power to at least one or more of the one or more computing devices.

In one embodiment, the step of actuating a forced shutdown includes the step of:

a. actuating a forced shutdown of one or more communications devices in a network connecting the one or more computing devices by actuating at least one or more shutdown switches, wherein actuation of the at least one or more shutdown switches shuts off power to at least one or more of the one or more communications devices.

In one embodiment, the step of actuating a forced shutdown includes the step of:

a. executing white listed files from backed up copies of the white listed files.

In one embodiment, the method includes the step of:

a. logging out all users on the one or more computing devices.

In one embodiment, the step of monitoring a plurality of digital files for the rate of modifications includes the step of:

a. monitoring the modified file timestamp present on the file record of at least one or more digital files for the rate of modifications of the modified file timestamp present on the file record of the at least one or more digital files.

In one embodiment, the step of monitoring a plurality of digital files for the rate of modifications includes the step of:

a. monitoring the read, accessed and modified timestamps as well as deleted files (i.e. hitherto referred to as file system modifications) present on the file record of at least one or more digital files for the rate or pattern of modifications to the file system of at least one or more digital files.

In one embodiment, the step of monitoring a plurality of digital files for the rate of modifications includes the step of:

a. determining whether the total number of modifications meets a predetermined activity threshold.

In one embodiment, the step of monitoring a plurality of digital files for the rate of modifications includes the step of:

a. determining whether the total number of modifications corresponds to an filesystem access pattern.

In one embodiment, the step of monitoring a plurality of digital files for the rate of modifications includes the step of:

a. allocating a weighting to one or more selected from:

i. the monitored rate of modifications;

ii. the total number of modifications; and iii. the type of filesystem access pattern.

In one embodiment, the method includes the step of:

a. creating a backup copy of the files being modified.

In one embodiment, the method includes the step of:

a. creating a backup copy of critical operating system and executable files necessary for enforced shutdown and instigating software system protection against modification of these files from all users including those at administrator level.

In one embodiment, the method includes the step of:

a. generating an alert signal in response to the rate of modifications exceeding a predetermined threshold.

Network Portion Shutdown

In one embodiment, the method includes the step of:

a. actuating the disconnection of the network connection.

In one embodiment, the method includes the step of:

a. actuating the physical disconnection of the network connection.

In one embodiment, the method includes the step of:

a. actuating the virtual disconnection of the network connection.

In one embodiment, the method includes the step of:

a. determining which shutdown switches are associated with the affected computing devices.

In one embodiment, the method includes the step of:

a. actuating the shutdown of switches associated with the affected computing devices to shut power to the affected devices.

In one embodiment, the method includes the step of:

a. detecting tampering on the ransomware mitigation system files.

In one embodiment, the method includes the step of:

a. detecting tampering on ransomware mitigation system communications processes with one or more selected from
   i. one or more electromechanical switches,
   ii. one or more hardware locks; and
   iii. peripheral hardware.

In one embodiment, the method includes the step of:

a. actuating the shutdown of power to at least one or more of the computing devices being monitored by the ransomware mitigation system files in the event of the detection of tampering on one or more selected from the ransomware mitigation system files and/or ransomware mitigation system communications processes.

In one embodiment, the method includes the step of:

a. disabling the operating system of the one or more computing devices by forced exception interrupt processing.

In one embodiment, the method includes the step of:

a. disabling the operating system of the one or more computing devices by forced exception interrupt processing leading to an operating system halt where no shutdown software facility exists or power cannot be interrupted.

Hardware Lock

In one embodiment, the ransomware mitigation system includes a hardware lock configured for manual reconfiguration between an unlocked condition; and a locked condition, and the method includes the step of.

a. receiving a request for modification of the system files of the ransomware mitigation system;

b. determining whether the hardware lock is in its unlocked condition; and c. only allowing the processing of the request for modification of the system files of the ransomware mitigation system in the event that the hardware lock is in its unlocked condition.

Machine Learning

In one embodiment, the step of monitoring a plurality of digital files for the rate of modifications includes the step of:

a. utilising an artificial intelligence (AI) model to establish the predetermined threshold.

In one embodiment, the AI model is based on one or more selected from machine learning, deep learning and neural networks.

In one embodiment, the step of monitoring a plurality of digital files for the rate of modifications includes the step of:

a. training the AI model on previous data of the modification of files in order to generate the one or more selected from the neural model and the AI model.

In one embodiment, the step of monitoring a plurality of digital files for the rate of modifications includes the step of:

a. training the AI model on historical data from the one or more computing devices including one or more selected from:
   i. number of users;
   ii. time of day;
   iii. rate of modifications;
   iv. total number of modifications of files in a single process;
   v. local intrusion attempts;
   vi. connecting internet protocol (IP) addresses;
   vii. originating communication locations;
   viii. emerging risk management data from online resources; and ix. any other suitable data.

In one embodiment, the method includes the step of sending an actuation signal to actuate the provision of electrical power to a backup computing device.

In one embodiment, the method includes the step of sending an actuation signal to actuate the connection of backup computing devices to a network.

According to a further aspect, the invention may be said to consist in a computer readable storage medium configured for installing digital instructions for mitigating damage done to one or more computing devices from a ransomware attack, the computer readable storage medium being configured for installing instructions for:

a. monitoring a plurality of digital files for the rate of modifications carried out on the plurality of digital files;

b. determining whether the monitored rate of modifications meets a predetermined activity threshold; and c. actuating a forced shutdown of the one or more computing devices.

In one embodiment, the computer readable storage medium is configured for installing instructions for:

a. actuating a forced shutdown of the one or more computing devices by actuating a command at machine code level in the one or more computing devices.

In one embodiment, the computer readable storage medium is configured for installing instructions for:

a. actuating a forced shutdown of the one or more computing devices by actuating a command at machine code level in the one or more computing devices that cannot be countermanded or terminated, even at administrator level.

In one embodiment, the computer readable storage medium is configured for installing instructions for:

a. actuating a forced shutdown of the one or more computing devices by actuating a command at machine code level in the one or more computing devices, causing the one or more computing devices to cease all other processes except shutdown processes.

In one embodiment, the computer readable storage medium is configured for installing instructions for:

a. allocating a whitelist of shutdown files that are part of the shutdown process and only allowing whitelisted shutdown files to operate on actuation of the forced shutdown.

In one embodiment, the computer readable storage medium is configured for installing instructions for:

a. preventing modification of the whitelisted files during the forced shutdown of the one or more computing devices.

In one embodiment, the computer readable storage medium is configured for installing instructions for:

a. creating a locked backup copy of whitelisted files.

In one embodiment, the computer readable storage medium is configured for installing instructions for:

a. restoring whitelisted files from the locked backup copy in the event that a white listed file is modified.

In one embodiment, the computer readable storage medium is configured for installing instructions for:

a. actuating a forced shutdown of the one or more computing devices by actuating one or more shutdown switches, wherein actuation of the shutdown switch shuts off power to at least one or more of the one or more computing devices.

In one embodiment, the computer readable storage medium is configured for installing instructions for:

a. actuating a forced shutdown of one or more communications devices in a network connecting the one or more computing devices by actuating at least one or more shutdown switches, wherein actuation of the at least one or more shutdown switches shuts off power to at least one or more of the one or more communications devices.

In one embodiment, the computer readable storage medium is configured for installing instructions for:

a. executing white listed files from backed up copies of the white listed files.

In one embodiment, the computer readable storage medium is configured for installing instructions for:

a. logging out all users on the one or more computing devices.

In one embodiment, the computer readable storage medium is configured for installing instructions for:

a. monitoring the modified file timestamp present on the file record of at least one or more digital files for the rate of modifications of the modified file timestamp present on the file record of the at least one or more digital files.

In one embodiment, the computer readable storage medium is configured for installing instructions for:

a. monitoring the read, accessed and modified timestamps as well as deleted files (i.e. hitherto referred to as file system modifications) present on the file record of at least one or more digital files for the rate or pattern of modifications to the file system of at least one or more digital files.

In one embodiment, the computer readable storage medium is configured for installing instructions for:

a. determining whether the total number of modifications meets a predetermined activity threshold.

In one embodiment, the computer readable storage medium is configured for installing instructions for:

a. determining whether the total number of modifications corresponds to an filesystem access pattern.

In one embodiment, the computer readable storage medium is configured for installing instructions for:

a. allocating a weighting to one or more selected from:
        i. the monitored rate of modifications;
        ii. the total number of modifications; and
        iii. the type of filesystem access pattern.

In one embodiment, the computer readable storage medium is configured for installing instructions for:

a. creating a backup copy of the files being modified.

In one embodiment, the computer readable storage medium is configured for installing instructions for:

a. creating a backup copy of critical operating system and executable files necessary for enforced shutdown and instigating software system protection against modification of these files from all users including those at administrator level.

In one embodiment, the computer readable storage medium is configured for installing instructions for:

a. generating an alert signal in response to the rate of modifications exceeding a predetermined threshold.

Network Portion Shutdown

In one embodiment, the computer readable storage medium is configured for installing instructions for:

a. actuating the disconnection of the network connection.

In one embodiment, the computer readable storage medium is configured for installing instructions for:

a. actuating the physical disconnection of the network connection.

In one embodiment, the computer readable storage medium is configured for installing instructions for:

a. actuating the virtual disconnection of the network connection.

In one embodiment, the computer readable storage medium is configured for installing instructions for:

a. determining which shutdown switches are associated with the affected computing devices.

In one embodiment, the computer readable storage medium is configured for installing instructions for:

a. actuating the shutdown of switches associated with the affected computing devices to shut power to the affected devices.

In one embodiment, the computer readable storage medium is configured for installing instructions for:

a. detecting tampering on the ransomware mitigation system files.

In one embodiment, the computer readable storage medium is configured for installing instructions for:

a. detecting tampering on ransomware mitigation system communications processes with one or more selected from
        i. one or more electromechanical switches,
        ii. one or more hardware locks; and
        iii. peripheral hardware.

In one embodiment, the computer readable storage medium is configured for installing instructions for:

a. actuating the shutdown of power to at least one or more of the computing devices being monitored by the ransomware mitigation system files in the event of the detection of tampering on one or more selected from the ransomware mitigation system files and/or ransomware mitigation system communications processes.

In one embodiment, the computer readable storage medium is configured for installing instructions for:

a. disabling the operating system of the one or more computing devices by forced exception interrupt processing.

In one embodiment, the computer readable storage medium is configured for installing instructions for:

a. disabling the operating system of the one or more computing devices by forced exception interrupt processing leading to an operating system halt where no shutdown software facility exists or power cannot be interrupted.

Hardware Lock

In one embodiment, the ransomware mitigation system includes a hardware lock configured for manual reconfiguration between an unlocked condition; and a locked condition, and the computer readable storage medium is configured for installing instructions for:

a. receiving a request for modification of the system files of the ransomware mitigation system;
    b. determining whether the hardware lock is in its unlocked condition; and
    c. only allowing the processing of the request for modification of the system files of the ransomware mitigation system in the event that the hardware lock is in its unlocked condition.

Machine Learning

In one embodiment, the computer readable storage medium is configured for installing instructions for:

a. utilising one or more selected from a neural model and an artificial intelligence (AI) model to establish the predetermined threshold.

In one embodiment, the computer readable storage medium is configured for installing instructions for:

a. training one or more selected from a neural network, an artificial intelligence (AI) and an associative neural network on previous data of the modification of files in order to generate the one or more selected from the neural model and the AI model.

In one embodiment, the computer readable storage medium is configured for installing instructions for:

a. training the neural network on historical data from the one or more computing devices including one or more selected from:

i. number of users;

ii. time of day;

iii. rate of modifications;

iv. total number of modifications of files in a single process;

v. local intrusion attempts;

vi. connecting internet protocol (IP) addresses;

vii. originating communication locations;

viii. emerging risk management data from online resources; and ix. any other suitable data.

In one embodiment, the computer readable storage medium is configured in the form of a downloadable digital package.

In one embodiment, the digital package is downloadable from an online resource.

In one embodiment, the digital package is configured to be downloaded and installed on at least one or more computing devices.

In one embodiment, the computer readable storage medium is configured for installing instructions for:

a. sending an actuation signal to actuate the provision of electrical power to a backup computing device.

In one embodiment, the computer readable storage medium is configured for installing instructions for:

a. sending an actuation signal to actuate the connection of backup computing devices to a network.

According to a further aspect, the invention may be said to consist in a shutdown switch for shutting down at least one or more computing devices on actuation by monitoring software of a ransomware mitigation system, the shutdown switch including:

a. a disconnection device configured for disconnecting, in a disconnection event, one or more selected from i. an electrical power coupling;

ii. a data coupling;

b. an actuation system configured for causing a disconnection event in the disconnection device on being actuated by the monitoring software of a ransomware mitigation system, to thereby disconnect one or more selected from i. electrical power flowing through the electrical power coupling; and ii. data being transferred through the data coupling.

In one embodiment, the shutdown switch is configured for synchronous bidirectional communication with the monitoring software.

In one embodiment, the shutdown switch includes a shutdown switch transceiver configured for communication with a software monitoring module monitoring a plurality of digital files for the rate of modifications carried out on the plurality of digital files.

In one embodiment, the shutdown switch includes a shutdown switch transceiver configured for communicating with one or more selected from a monitoring device transceiver associated with the monitoring software and with one or more shutdown switch transceivers on other similar shutdown switches.

In one embodiment, the shutdown switch transceiver is configured for communicating with one or more selected from the monitoring device transceiver and with one or more shutdown switch transceivers on other similar shutdown switches on a network independent of the network that the computing devices are connected to.

In one embodiment, the actuation system is configured for causing a disconnection event in the event of a breakdown of synchronised communication between the shutdown switch and the monitoring software.

In one embodiment, the actuation system is configured for causing a disconnection event on receiving a disconnection signal from the monitoring software.

In one embodiment, the shutdown switch includes a transceiver.

In one embodiment, the transceiver is configured for receiving a disconnection signal from monitoring software on a monitoring computing device.

According to a further aspect, the invention may be said to consist in a ransomware mitigation system for mitigating damage done to one or more computing devices from a ransomware attack, the ransomware mitigation system comprising:

a. a software monitoring portion configured for monitoring activity relating to one or more files and at least one or more computing devices;

a. a switching device configured for shutting down one or more selected from i. power to the at least one or more computing devices, and ii. network communications with the at least one or more computing devices; and b. wherein the switching device includes a transceiver configured for independent communication with the software monitoring portion, and c. wherein the switching device is configured for, on receiving an actuation signal from the software monitoring portion in the event that the software monitoring portion detects the presence of ransomware on one or more selected from the computing device, and a network that the computing device is connected to, actuating the switching device to shut down one or more selected from i. power to the at least one or more computing devices, and ii. network communications with the at least one or more computing devices.

In one embodiment, the switching device is further configured for connecting power to one or more alternative computing devices.

In one embodiment, the switching device is further configured for connecting network communications to one or more alternative computing devices.

According to a further aspect, the invention may be said to consist in a shutdown switch for shutting down at least one or more computing devices on actuation by a ransomware mitigation system as described.

In one embodiment, the shutdown switch is configurable for connecting an electrical circuit.

In one embodiment, the shutdown switch includes a receiver.

In one embodiment, the shutdown switch includes a transceiver.

In one embodiment, the receiver is a wireless receiver.

In one embodiment, the receiver is configured for receiving an actuation signal from a remote terminal.

In one embodiment, the shutdown switch is configured to open and/or close an electrical circuit on receiving an actuation signal.

In one embodiment, the receiver is configured for receiving a confirmation signal at regular intervals.

In one embodiment, the receiver is configured for receiving a confirmation signal from a remote terminal at regular intervals.

In one embodiment, the shutdown switch is configured for opening and/or closing the electrical circuit in the event that a confirmation signal is not received at an expected interval.

In one embodiment, the receiver is configured for receiving a confirmation signal continuously.

In one embodiment, the receiver is configured for receiving a confirmation signal from a remote terminal continuously.

In one embodiment, the shutdown switch is configured for opening and/or closing the electrical circuit in the event that a confirmation signal is not received continuously.

In one embodiment, the shutdown switch includes a switch processor.

In one embodiment, the shutdown switch includes switch digital storage media configured for storing one or more selected from data and software instructions.

In one embodiment, the switch processor is configured for being directed by the switch software instructions to actuate a drive circuit to open and/or close the electrical circuit at a switching device.

In one embodiment, the switching device includes a mechanical key-switch.

In one embodiment, the switching device includes a solenoid that is operable by the switch processor to open and/or close the mechanical key-switch to power off the protected computing devices.

In one embodiment, the switching device includes an over centre switch.

In one embodiment, the switching device includes a solenoid that is operable by the switch processor to open and/or close the over centre switch.

In one embodiment, the switching device includes a reset switch for closing and/or opening the electrical circuit.

In one embodiment, the switching device includes a reset switch which is configured to be manually manipulated to close and/or open the electrical circuit.

In one embodiment, the switching device includes a reset switch which is configured to electrically close and/or open the electrical circuit.

In one embodiment, the shutdown switch is configured for receiving a confirmation signal from the ransomware mitigation system.

In one embodiment, the shutdown switch is configured for receiving a confirmation signal from the ransomware mitigation system at regular intervals.

In one embodiment, the shutdown switch is configured for continuously receiving a confirmation signal from the ransomware mitigation system.

In one embodiment, the shutdown switch is configured for opening and/or closing the electrical circuit at a switching device in the event that a confirmation signal is not received from the ransomware mitigation system.

In one embodiment, the shutdown switch is configured for opening and/or closing the electrical circuit at a switching device in the event that a confirmation signal is not received from the ransomware mitigation system at a regular interval.

In one embodiment, the shutdown switch includes a plug socket for connecting electrical power to a computing device.

According to a further aspect, the invention may be said to consist in a tamper prevention system for preventing the likelihood of tampering with a ransomware mitigation system by ransomware; the tamper prevention system comprising:

a. a monitoring portion configured for monitoring activities relating to one or more files on at least one or more computing devices;

b. a switching device configured for shutting down one or more selected from i. power to the at least one or more computing devices, and ii. network communications with the at least one or more computing devices; and c. wherein the switching device and the monitoring portion are configured for communication with each other in a synchronised fashion, and wherein at least one or more selected from the switching device and the monitoring portion are configured for actuating a shutdown event in the event that communication between the monitoring portion and the switching device is not synchronized and/or correct.

In one embodiment, the actuation event is one or more selected from:

a. actuating the shutdown of power to the at least one or more computing devices, b. actuating the termination of network communications with the at least one or more computing devices, and c. actuating the immediate termination of operation of the file system of the at least one or more computing devices.

In one embodiment, the switching device and the monitoring portion are configured for one or more selected from encrypted, protected and locked communication with each other.

In one embodiment, the switching device and the monitoring portion each including a transceiver.

In one embodiment, the switching device and/or the monitoring portion are configured for comparing an expected signal from the other of the switching device and/or the monitoring portion from an actual signal received from the other of the switching device and/or the monitoring portion.

In one embodiment, the switching device and/or the monitoring portion are configured for actuating the shutdown event if an expected signal is not received.

In one embodiment, the switching device and/or monitoring portion are configured for actuating the shutdown event if an expected signal is not received within a predetermined time threshold.

In one embodiment, the switching device and/or monitoring portion configured for actuating the shutdown event if a signal is received within a predetermined time threshold, but the signal is not the expected signal.

In one embodiment, the monitoring portion is a software module.

In one embodiment, the monitoring portion includes a monitoring portion transceiver.

In one embodiment, the switching device is configured for synchronous bidirectional communication with the monitoring portion.

In one embodiment, the switching device includes a shutdown switch transceiver configured for communication with the monitoring portion.

In one embodiment, the switching device includes a shutdown switch transceiver configured for communicating with one or more selected from a monitoring portion transceiver associated with the monitoring portion and with one or more shutdown switch transceivers on other similar shutdown switches.

In one embodiment, the switching device transceiver is configured for communicating with one or more selected from the monitoring portion transceiver and with one or more shutdown switch transceivers on other similar shutdown switches on a network independent of the network that the computing devices are connected to.

According to a further aspect, the present invention may be said to consist in a method of mitigating damage done to one or more computing devices from a ransomware attack, the method being carried out on an electronic device and comprising the steps of:

i. monitoring a plurality of digital files for the rate of modifications carried out on the plurality of digital files;
 ii. determining whether the monitored rate of modifications meets a predetermined activity threshold; and
 iii. actuating the disconnection of the network connection.

According to a further aspect, the present invention may be said to consist in a ransomware mitigation system for mitigating damage done to one or more computing devices connected to the Internet by a network connection from a ransomware attack, the ransomware mitigation system comprising:

a. digital storage media configured for storing data and/or instructions;
 b. a processor operationally connected to the digital storage media and configured to be directed by instructions; and
 c. a transceiver operably connected to the processor for transmitting and/or receiving digital information;
 d. wherein the processor is configured to be guided by the instructions to carry out the steps of:
  i. monitoring a plurality of digital files for the rate of modifications carried out on the plurality of digital files;
  ii. determining whether the monitored rate of modifications meets a predetermined activity threshold; and
  iii. actuating the disconnection of the network connection.

In one embodiment, the processor is configured to be guided by the instructions to carry out the step of:
 a. actuating the physical disconnection of the network connection.

In one embodiment, the processor is configured to be guided by the instructions to carry out the step of:
 a. actuating the virtual disconnection of the network connection.

In one embodiment, the processor is configured to be guided by the instructions to carry out the step of:
 a. actuating a forced shutdown of the one or more computing devices.

In one embodiment, the processor is configured to be guided by the instructions to carry out the step of:
 a. actuating a forced shutdown of the one or more computing devices by actuating a command at machine code level in the one or more computing devices.

In one embodiment, the processor is configured to be guided by the instructions to carry out the step of:
 a. actuating a forced shutdown of the one or more computing devices by actuating a command at machine code level in the one or more computing devices that cannot be countermanded or terminated, even at administrator level.

In one embodiment, the processor is configured to be guided by the instructions to carry out the step of:
 a. actuating a forced shutdown of the one or more computing devices by actuating a command at machine code level in the one or more computing devices, causing the one or more computing devices to cease all other processes except shutdown processes.

In one embodiment, the processor is configured to be guided by the instructions to carry out the step of:
 a. allocating a whitelist of shutdown files that are part of the shutdown process and only allowing whitelisted shutdown files to operate on actuation of the forced shutdown.

In one embodiment, the processor is configured to be guided by the instructions to carry out the step of:
 a. preventing modification of the whitelisted files during the forced shutdown of the one or more computing devices.

In one embodiment, the processor is configured to be guided by the instructions to carry out the step of:
 a. creating a locked backup copy of whitelisted files.

In one embodiment, the processor is configured to be guided by the instructions to carry out the step of:
 a. restoring whitelisted files from the locked backup copy in the event that a whitelisted file is modified.

In one embodiment, the processor is configured to be guided by the instructions to carry out the step of:
 a. actuating a forced shutdown of the one or more computing devices by actuating one or more power shutdown switches, wherein actuation of the power shutdown switch shuts off power to at least one or more of the one or more computing devices.

In one embodiment, the processor is configured to be guided by the instructions to carry out the step of:
 a. actuating a forced shutdown of one or more communications devices in a network connecting the one or more computing devices by actuating at least one or more network shutdown switches, wherein actuation of the at least one or more network shutdown switches shuts off power to at least one or more of the one or more communications devices.

In one embodiment, the processor is configured to be guided by the instructions to carry out the step of:
 a. logging out all users that are logged onto the one or more computing devices.

In one embodiment, the processor is configured to be guided by the instructions to carry out the step of:
 a. monitoring the modified file timestamp present on the file record of at least one or more digital files for the rate of modifications of the modified file timestamp present on the file record of the at least one or more digital files.

In one embodiment, the processor is configured to be guided by the instructions to carry out the step of:
 a. monitoring the read, accessed and modified timestamps as well as deleted files (i.e. hitherto referred to as file system modifications) present on the file record of at least one or more digital files for the rate or pattern of modifications to the file system of at least one or more digital files.

In one embodiment, the at least one or more power shutdown switches are one or more selected from software switches and electromechanical switches.

In one embodiment, the at least one or more network shutdown switches are one or more selected from software switches and electromechanical switches.

In one embodiment, the processor is configured to be guided by the instructions to carry out the step of:

a. determining whether the total number of modifications meets a predetermined activity threshold.

In one embodiment, the processor is configured to be guided by the instructions to carry out the step of:

a. determining whether the total number of modifications corresponds to an filesystem access pattern.

In one embodiment, the processor is configured to be guided by the instructions to carry out the step of:

a. allocating a weighting to one or more selected from
      i. the monitored rate of modifications;
      ii. the total number of modifications; and
      iii. the type of filesystem access pattern.

In one embodiment, the processor is configured to be guided by the instructions to carry out the step of:

a. creating a backup copy of the files being modified.

In one embodiment, the processor is configured to be guided by the instructions to carry out the step of:

a. creating a backup copy of critical operating system and executable files necessary for enforced shutdown and instigating software system protection against modification of these files from all users including those at administrator level.

In one embodiment, the processor is configured to be guided by the instructions to carry out the step of:

a. generating an alert signal in response to the rate of modifications exceeding a predetermined threshold.

In one embodiment, the processor is configured to be guided by the instructions to carry out the step of:

a. determining the network location of the computing devices on which the rate of file modification has exceeded the threshold (the "affected computing devices").

In one embodiment, the ransomware mitigation system includes a database of computing devices being monitored, together with their network location.

In one embodiment, the ransomware mitigation system includes a database of power shutdown switches and/or network shutdown switches.

In one embodiment, each power shutdown switches and/or network shutdown switch is associated with one or more computing devices being monitored.

In one embodiment, each power shutdown switch is associated with one or more computing devices being monitored, the shutdown switch being configured for cutting power to at least one or more of its associated computing devices.

In one embodiment, each power shutdown switch is associated with one or more computing devices being monitored, the shutdown switch being configured for disconnecting communications between one or more selected from the Internet and one or more of the computing devices, and between the computing devices.

Network Portion Shutdown

In one embodiment, the processor is configured to be guided by the instructions to carry out the step of:

a. determining which shutdown switches are associated with the affected computing devices.

In one embodiment, the processor is configured to be guided by the instructions to carry out the step of:

a. actuating the shutdown of power switches associated with the affected computing devices to shut power to the affected devices.

In one embodiment, the processor is configured to be guided by the instructions to carry out the step of:

a. actuating the shutdown of switches associated with the affected computing devices to disconnect communications with the affected devices.

In one embodiment, the processor is configured to be guided by the instructions to carry out the step of:

a. detecting tampering on the ransomware mitigation system files.

In one embodiment, the processor is configured to be guided by the instructions to carry out the step of:

a. detecting tampering on ransomware mitigation system communications processes with one or more selected from
      i. one or more electromechnical switches,
      ii. one or more hardware locks; and
      iii. peripheral hardware.

In one embodiment, the processor is configured to be guided by the instructions to carry out the step of:

a. actuating the shutdown of power to all of the computing device is being monitored by the ransomware mitigation system files in the event of the detection of tampering on one or more selected from the ransomware mitigation system files and/or ransomware mitigation system communications processes.

In one embodiment, the processor is configured to be guided by the instructions to carry out the step of:

a. disabling the operating system of the one or more computing devices by forced exception interrupt processing.

In one embodiment, the processor is configured to be guided by the instructions to carry out the step of:

a. disabling the operating system of the one or more computing devices by forced exception interrupt processing leading to an operating system halt where no shutdown software facility exists or power cannot be interrupted.

Hardware Lock

In one embodiment, the ransomware mitigation system includes a hardware lock.

In one embodiment, the hardware lock includes is a device that can be inserted into a standard computer port, such as a USB port or plugged into a network or computer BUS system.

In one embodiment, the hardware lock is configured for manual manipulation.

In one embodiment, the hardware lock is configured for manual manipulation for purposes of maintenance or administration of the ransomware mitigation system.

In one embodiment, the hardware lock is configured for being operated by a hardware key.

In one embodiment, the hardware key is a mechanical key-switch.

In one embodiment, the hardware lock is reconfigurable between a. an unlocked condition; and
    b. a locked condition.

In one embodiment, the processor is configured to be guided by the instructions to carry out the step of:

a. receiving a request for modification of the system files of the ransomware mitigation system;
    b. determining whether the hardware lock is in its unlocked condition; and
    c. only allowing the processing of the request for modification of the system files of the ransomware mitigation system in the event that the hardware lock is in its unlocked condition.

Machine Learning

In one embodiment, the processor is configured to be guided by the instructions to carry out the step of:

a. utilising an artificial intelligence (AI) model to establish the predetermined threshold.

In one embodiment, the AI model is based on one or more selected from machine learning, deep learning and neural networks.

In one embodiment, the processor is configured to be guided by the instructions to carry out the step of:

a. training an artificial intelligence on previous data of the modification of files in order to generate the AI model.

In one embodiment, the processor is configured to be guided by the instructions to carry out the step of:

a. training the AI model on historical data from the one or more computing devices including one or more selected from:

i. number of users;

ii. time of day;

iii. rate of modifications;

iv. total number of modifications of files in a single process;

v. local intrusion attempts;

vi. connecting internet protocol (IP) addresses;

vii. originating communication locations;

viii. emerging risk management data from online resources; and ix. any other suitable data.

In one embodiment, the ransomware mitigation system is installed on one or more selected from a web server and a client computing device.

Power Shutdown Switch

In one embodiment, the shutdown switch includes an electrical circuit.

In one embodiment, the shutdown switch includes a receiver.

In one embodiment, the shutdown switch includes a transceiver.

In one embodiment, the receiver is a wireless receiver.

In one embodiment, the receiver is configured for receiving an actuation signal from a remote terminal.

In one embodiment, the shutdown switch is configured to open and/or close one or more electrical circuits on receiving an actuation signal.

In one embodiment, the receiver is configured for receiving a confirmation signal at regular intervals.

In one embodiment, the receiver is configured for receiving a confirmation signal from a remote terminal at regular intervals.

In one embodiment, the confirmation signal is encrypted.

In one embodiment, the confirmation is synchronised.

In one embodiment, the shutdown switch is configured for opening and/or closing the electrical circuit in the event that a confirmation signal is not received at an expected interval.

In one embodiment, the receiver is configured for receiving a confirmation signal continuously.

In one embodiment, the receiver is configured for receiving a confirmation signal from a remote terminal continuously.

In one embodiment, the shutdown switch is configured for opening and/or closing the electrical circuit in the event that a confirmation signal is not received continuously.

In one embodiment, the shutdown switch includes a switch processor.

In one embodiment, the shutdown switch includes switch digital storage media configured for storing one or more selected from data and software instructions.

In one embodiment, the switch processor is configured for being directed by the switch software instructions to open and/or close the electrical circuit at a switching device.

In one embodiment, the switch processor is configured for being directed by the switch software instructions to actuate a driver to open and/or close the electrical circuit at a switching device.

In one embodiment, the switching device includes a mechanical key-switch.

In one embodiment, the switching device includes at least one or more relays.

In one embodiment, the switching device includes an over centre switch.

In one embodiment, the switching device includes a solenoid that is operable by the switch processor to open and/or close the mechanical key-switch.

In one embodiment, the switching device includes a reset switch for closing and/or opening the electrical circuit.

In one embodiment, the switching device includes a reset switch which is configured to be manually manipulated to close and/or open the electrical circuit.

In one embodiment, the switching device includes a reset switch which is configured to electrically close and/or open the electrical circuit.

In one embodiment, the shutdown switch is configured for receiving a confirmation signal from the ransomware mitigation system.

In one embodiment, the shutdown switch is configured for receiving a confirmation signal from the ransomware mitigation system at regular intervals.

In one embodiment, the shutdown switch is configured for transmitting a confirmation signal to the ransomware mitigation system at regular intervals.

In one embodiment, the shutdown switch is configured for continuously receiving a confirmation signal from the ransomware mitigation system.

In one embodiment, the shutdown switch is configured for transmitting a confirmation signal to the ransomware mitigation system continuously.

In one embodiment, the shutdown switch is configured for opening and/or closing the electrical circuit at a switching device in the event that a confirmation signal is not received from the ransomware mitigation system.

In one embodiment, the shutdown switch is configured for opening and/or closing the electrical circuit at a switching device in the event that a confirmation signal is not received from the ransomware mitigation system at a regular interval.

In one embodiment, the shutdown switch includes a plug socket for connecting electrical power to a computing device.

It should be noted that the web server, software server, client computing device and the computer readable storage medium provide the same or similar advantages as the advantages provided by the corresponding computer implemented method, some of which are described herein. Additionally the web server and/or client computing device provides the advantage of deployment across a computer network, such as the Internet, providing distribution, access and economy of scale advantages. Furthermore, the computer readable storage medium provides further advantages, such allowing the deployment of computer instructions for installation and execution by one or more computing devices.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 9 shows a swim lane flow chart showing a second embodiment of a method for mitigating damage caused by ransomware;

DESCRIPTION OF EMBODIMENTS

Figure 1:
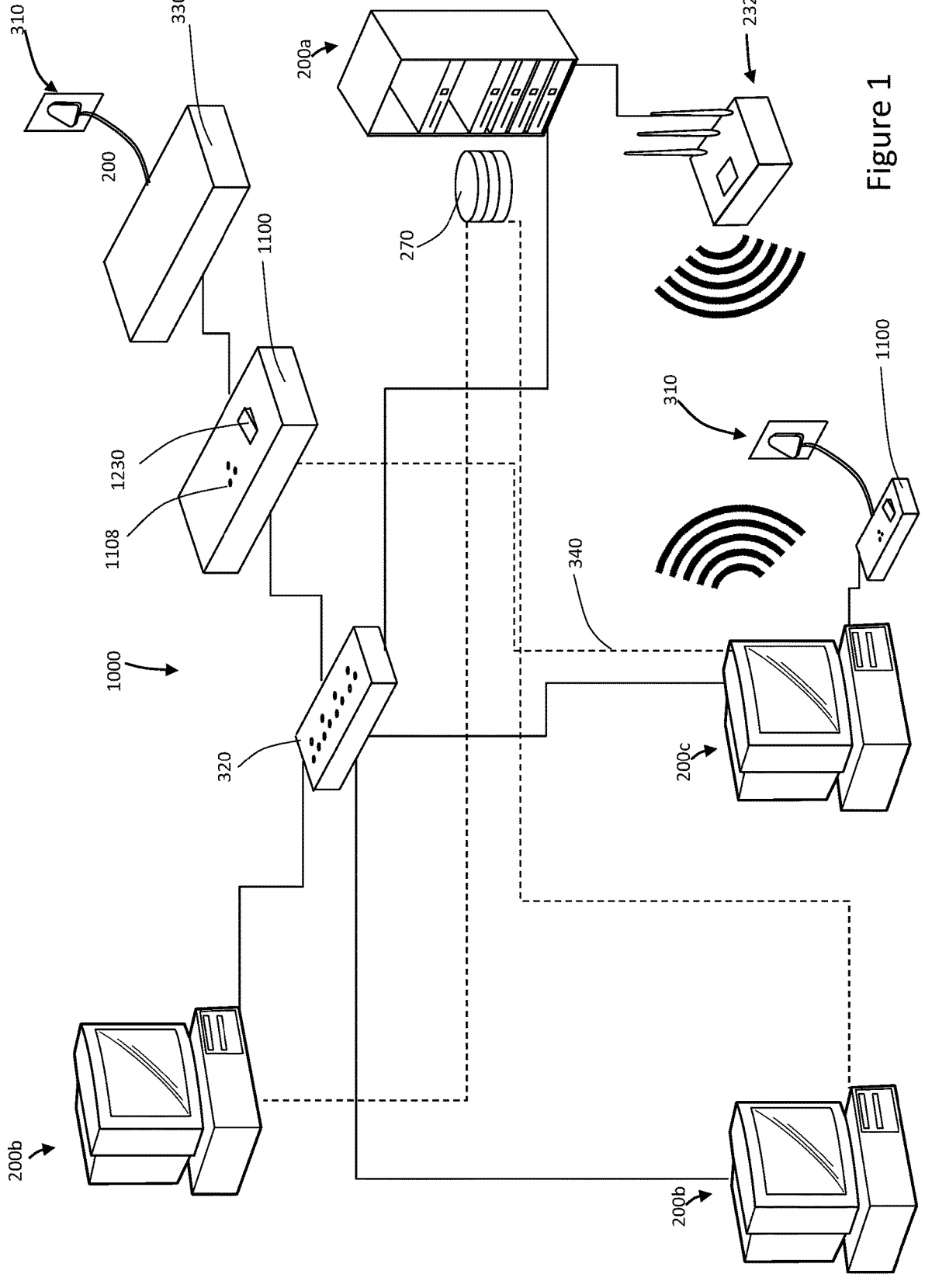
FIG. 1 shows a system of computing devices in a network being monitored by a ransomware mitigation system.

It should be noted in the following description that like or the same reference numerals in different embodiments denote the same or similar features.

System 1000 of Computing Devices

FIG. 1 shows a system 1000 of computing devices 200 and a shutdown switch 1100, these being adapted for mitigating damage done to one or more computing devices by a ransomware attack.

As will be described in further detail below, the system 1000 includes at least one, and preferably a plurality of computing devices 200 that are connected in a communications network 300. The computing devices 200 could, for example be in the form of a server 200*a*, a desktop PC 200*b*, a laptop, a phone, a tablet, or any similar device. The network 300 includes lines of communication, which may be hardwired (shown as broken lines), for example by ethernet cabling such as CAT5, CAT5E, CAT6 and CAT 6A cables that are laid in an office building, or by wireless lines of communication, for example using any of the EEE8002.11 protocols, Bluetooth, or the like.

In addition, the system 1000 includes power cabling (shown as an broken lines) extending from plug socket 310 to an uninterrupted power supply (UPS) 330. From the UPS, power is fed to a shutdown switch 1100. From the shutdown switch 1100 power is fed to a multi-adapter 320, from where power is supplied to the computing devices 200.

One or more of the computing devices 200 (or the server) in the network is set up as a monitoring machine 200*c* that monitors the network for suspicious activity in the nature of a ransomware attack. The monitoring machine 200*c* preferably includes a dedicated a hardwired control line 340 to the shutdown switch 1100, although it is also envisaged that the monitoring machine may be in wireless communication with the shutdown switch 1100.

Figure 2:
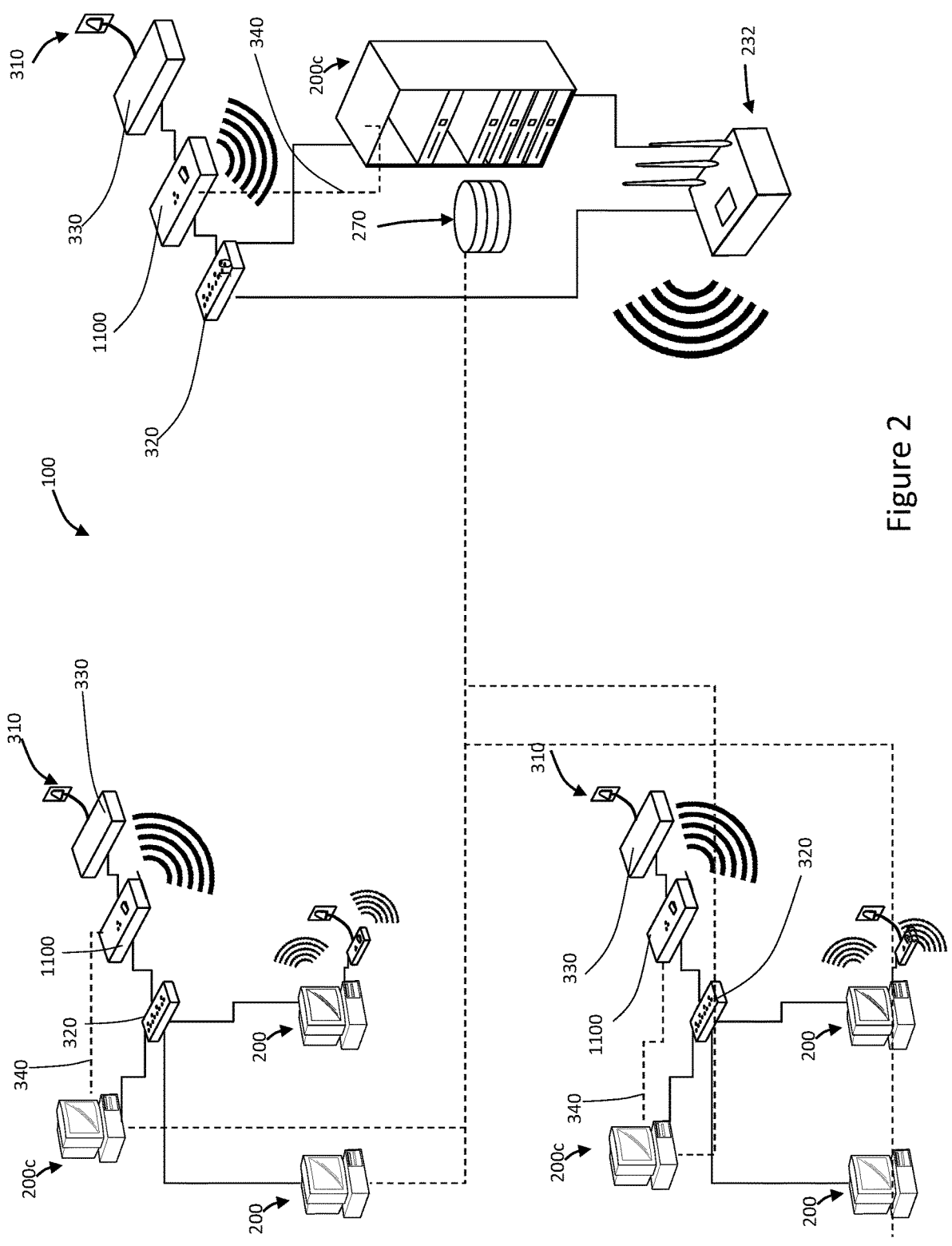
FIG. 2 shows a plurality of networks of computing devices, each computing device being monitored by a ransomware mitigation system.

FIG. 2 shows how multiple networks of computing devices 200 can be connected in a local area network (LAN), but may be connected on different power supplies in the form of electrical plug sockets 310 for computing devices on different parts of the LAN. Each of the power supplies 310 is provided with a shutdown switch 1100.

Figure 15:
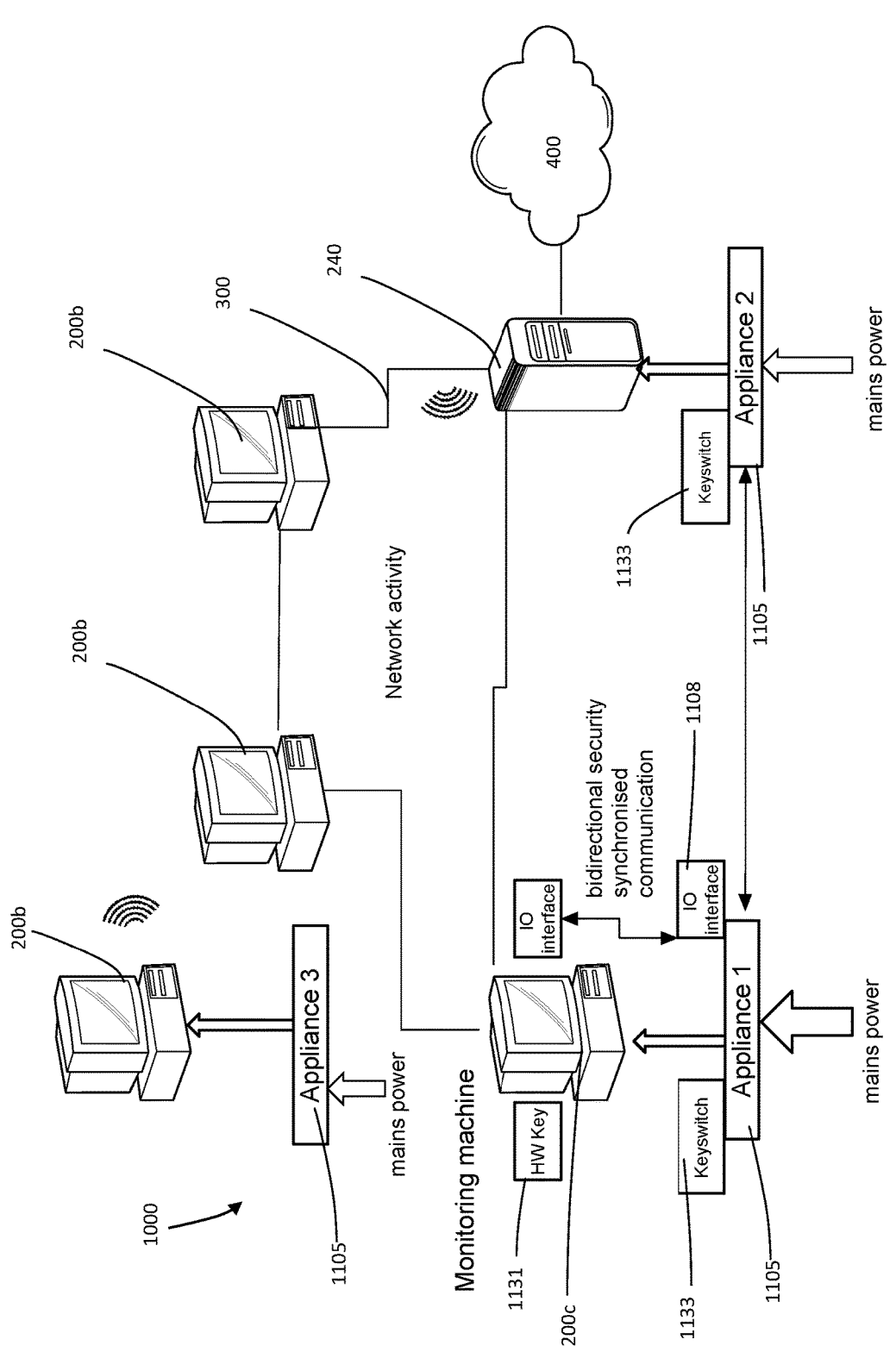
FIG. 15 shows another configuration of a system of computing devices in a network being monitored by a ransomware mitigation system.

FIG. 15 shows computing devices 200 connected with hardware units or shutdown switches 1100 (labelled "appliances") in a ransomware mitigation system 1000, wherein the protected computing devices 200 are not co-located in the same room, thereby necessitating cascading control of mains power. Monitoring device 200*c* includes a monitoring software portion or module that monitors the network traffic on network 300, as well as the wireless network.

It is envisaged that each computing device can include its own software monitoring portion or module that is in contact with the software monitoring portion or module of monitoring device 200*c*, or may be in contact with appliance 1 or its own appliance.

Monitoring device 200*c*, via the monitoring software portion, is in constant bidirectional synchronous communication with appliance 1 via a dedicated I/O interface as will be described in more detail below. In turn, appliance 1 is connected for direct control of appliance 2 by a wired network connection, and connected for control of appliance 3 by a wireless network connection. Appliance 1 is connected between the mains power and the monitoring machine 200*c*, appliance 2 is connected between the mains power and network router 240, and appliance 3 is connected between the mains power and a computing device 200*b* that is not on physical network 300.

The monitoring software portion can actuate appliance 1 to actuate appliances 2 and 3 to cut mains power to the router 240 as well as to the computing device 200 that is not on physical network 300. The monitoring software portion can also actuate appliance 1 to cut mains power to the monitoring machine 200*c*. By doing so, computing devices 200*b*, monitoring machine 200*c* and rata 240 can be either shut down immediately or isolated from the Internet in alternative embodiments, a similar process can be used to isolate any machine from a wireless or hardwired local area network (LAN) or wide area network (WAN). Clearly additional appliances could be used to cut mains power to the other computing devices 200*b*.

Figure 16:
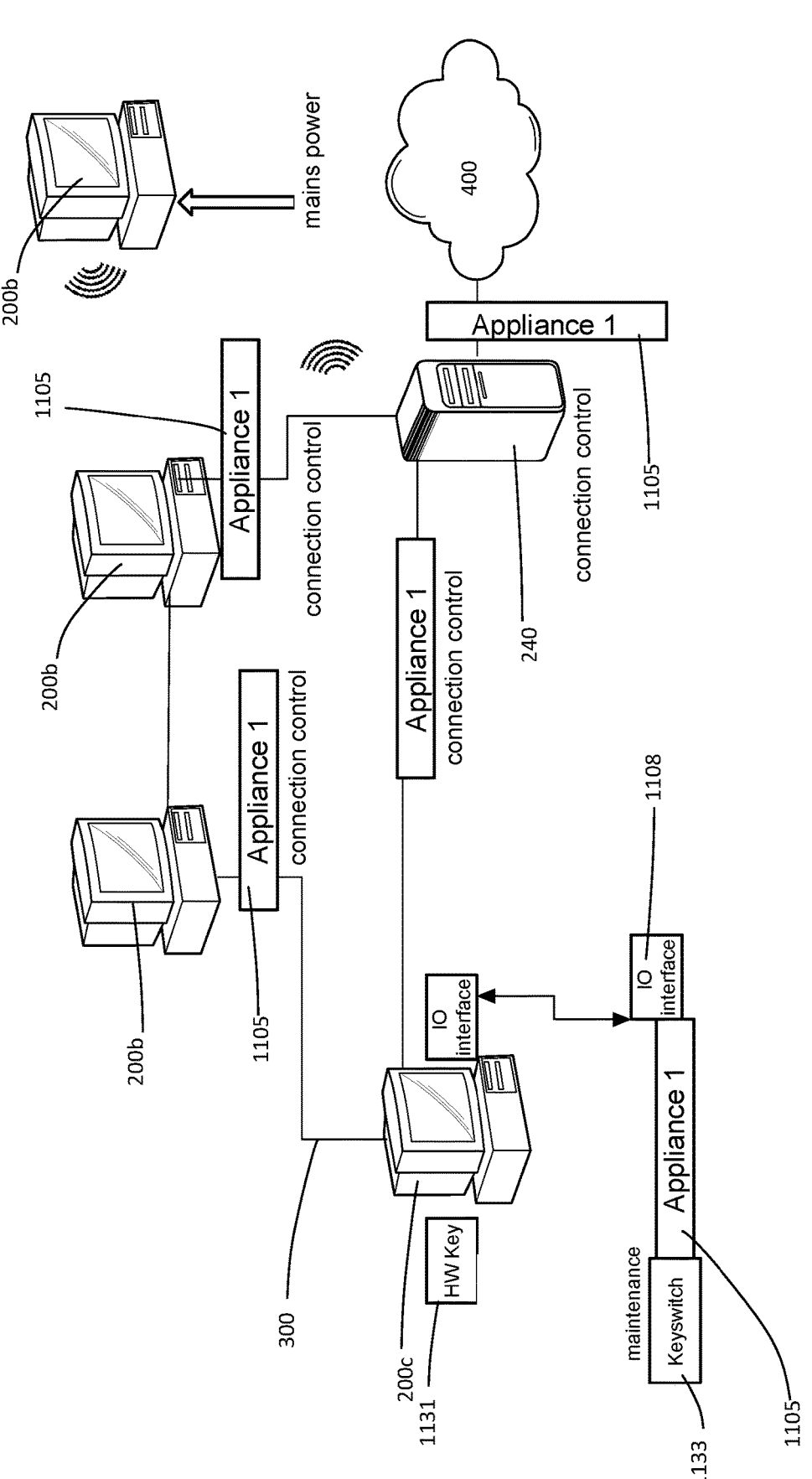
FIG. 16 shows another configuration of a system of computing devices in a network being monitored by a ransomware mitigation system.

FIG. 16 shows computing devices 200 connected with hardware units or shutdown switches 1100 (labelled "appliances") in a ransomware mitigation system 1000. Such a configuration could be used, for example, where all of the protected computing devices are co-located in the same room. Monitoring machine 200c includes a monitoring software portion that is in constant bidirectional synchronous communication with appliance 1, for example via a USB port. Network communications from the Internet 400 to router 240 is routed via appliance 1, while the hardwiring of the local area network 300 to computing devices 200b that are on network 300 is also routed via appliance 1. One of the computing devices 200b is not on the hardwired local area network 300, but is in wireless communication with the router 240. If all network communications that run via appliance 1 are disconnected, network communications to the monitoring machine 200c as well as all of the computing devices 200b connected to router 240 will cease.

Computing Device 200

Figure 3:
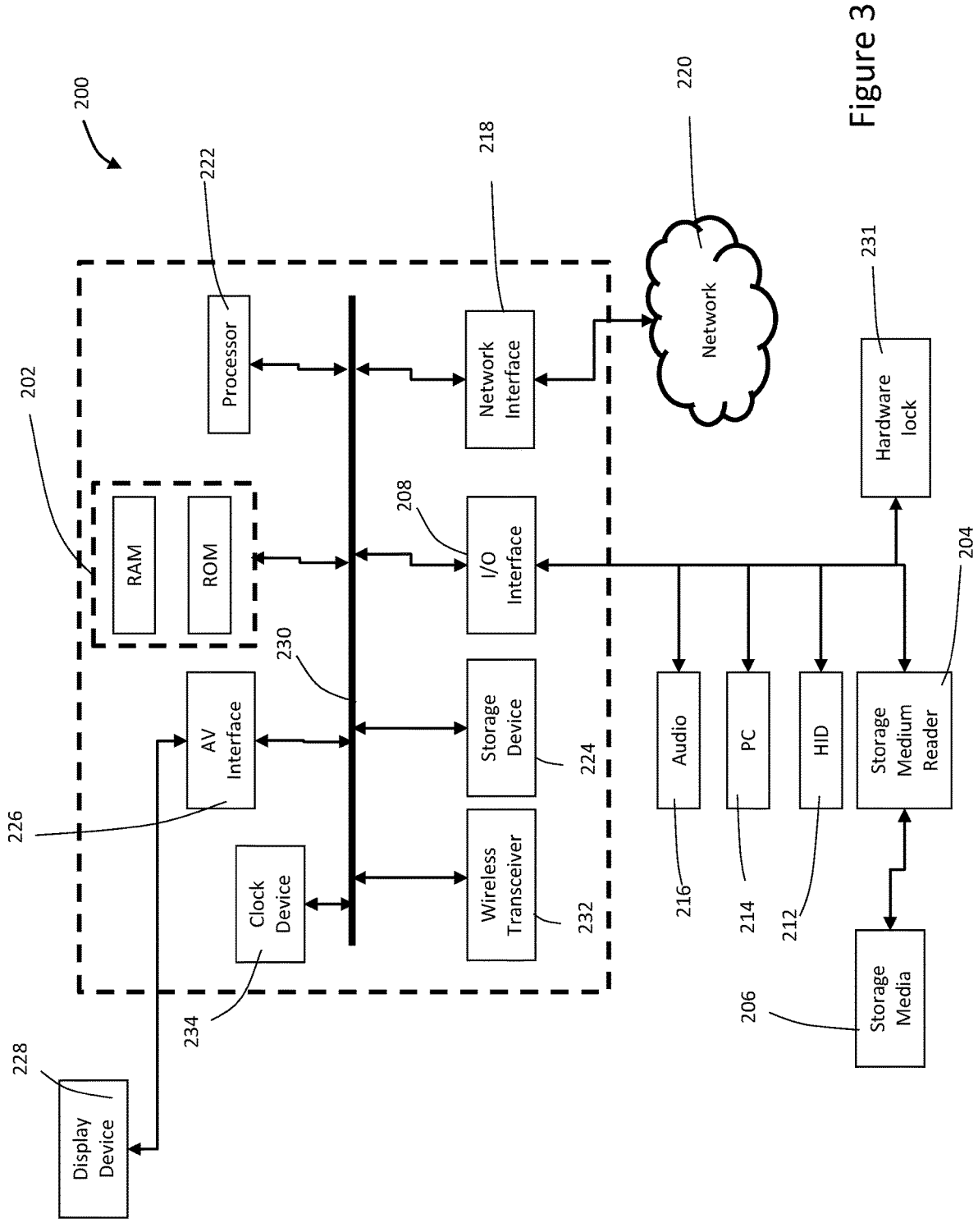
FIG. 3 shows a schematic diagram of a computing device on which a ransomware mitigation system may be provided.

FIG. 3 shows a computing device 200. In a preferred embodiment, the computing device 200 takes the form of a server 200a as described above, although it is envisaged that it could take the form of any other computing device such as a desktop PC, a laptop, or the like. In this manner, the computing device 200 is adapted to comprise functionality for communication over a network, storage capability (in the form of digital storage media) for storing user data and/or software instructions, and the like.

The computing device may comprise differing technical integers. In other words, the technical integers of the computing device 200 is shown in FIG. 3 are exemplary only and variations, adaptations and the like may be made thereto within the purposive scope of the embodiments described herein and having regard for the particular application of the computing device 200.

In particular the steps of the method for mitigating damage by a ransomware attack, as described in further detail below, may be implemented as computer program code instructions executable by the computing device 200, and the shutdown switch 1100 as will be explained in more detail below.

The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The computing device 200 comprises semiconductor memory 202 comprising volatile memory such as random access memory (RAM) or read only memory (ROM). The memory 202 may comprise either RAM or ROM or a combination of RAM and ROM.

The computing device 200 comprises a computer program code storage medium reader 204 for reading the computer program code instructions from computer program code storage media 206, according to a further aspect of the invention. The storage media 206 may be optical media such as CD-ROM disks, magnetic media such as floppy disks and tape cassettes or flash media such as USB memory sticks. Alternatively, the media 206 may be available from an online resource that is downloadable and installable, and accessed via the network as will be described below.

The device further comprises I/O interface 208 for communicating with one or more peripheral devices. The I/O interface 208 may offer both serial and parallel interface connectivity. For example, the I/O interface 208 may comprise a Small Computer System Interface (SCSI), Universal Serial Bus (USB) or similar I/O interface for interfacing with the storage medium reader 204. The I/O interface 208 may also communicate with one or more human input devices (HID) 212 such as keyboards, pointing devices, joysticks and the like. The I/O interface 208 may also comprise a computer to computer interface 214, such as a Recommended Standard 232 (RS-232) or similar interface, for interfacing the computing device 200 with one or more remote or external computing devices 200. The I/O interface 208 may also comprise an audio interface 216 for communicating audio signals to one or more audio devices (not shown), such as a speaker or a buzzer.

The device 200 also comprises a network interface 218 for communicating with one or more computer networks 220. The network 220 may be a wired network, such as a wired Ethernet™ network or a wireless network, such as a Bluetooth™ network or IEEE 802.11 network. The network 220 may be a local area network (LAN), such as a home or office computer network, or a wide area network (WAN), such as the Internet or private WAN.

The device 200 comprises an arithmetic logic unit or processor 222 for performing the computer program code instructions. The processor 222 may be a reduced instruction set computer (RISC) or complex instruction set computer (CISC) processor, or any other suitable processor. The computing device 200 further comprises a storage device 224, such as a magnetic disk hard drive or a solid state disk drive.

Computer program code instructions may be loaded into the storage device 224 from the storage media 206 using the storage medium reader 204 or from the network 220 using network interface 218. During the bootstrap phase, an operating system and one or more software applications are loaded from the storage device 224 into the memory 202. During the fetch-decode-execute cycle, the processor 222 fetches computer program code instructions from memory 202, decodes the instructions into machine code, executes the instructions and stores one or more intermediate results in memory 202.

In this manner, the instructions stored in the memory 202, when retrieved and executed by the processor 222, may configure the computing device 200 as a special-purpose machine that may perform the functions described herein.

The device 200 also comprises a video interface 226 for conveying video signals to a display device 228, such as a liquid crystal display (LCD), cathode-ray tube (CRT) or similar display device.

The computing device 200 also comprises a communication bus subsystem 230 for interconnecting the various devices described above. The bus subsystem 230 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

In addition, the computing device 200 can include a wireless transceiver 232 for transmitting and/or receiving data and/or commands over the network 220. The wireless transceiver 232 is preferably configured to communicate in one of the known protocols such as Wi-Fi (EEE802.11) or Bluetooth™. The wireless transceiver 232 may be located internally of the computing device 200, or could be configured as an external device such as a router 240 as shown in FIGS. 1 and 2.

The computing device 200 also preferably includes a clock device 234 which it may obtain the current time.

Further, the computing device can include a hardware lock 231 for providing enhanced security to prevent tampering of the ransomware mitigation system 1000 system files. The hardware lock 231 as described in more detail below.

Power Shutdown Switch

Figure 4:
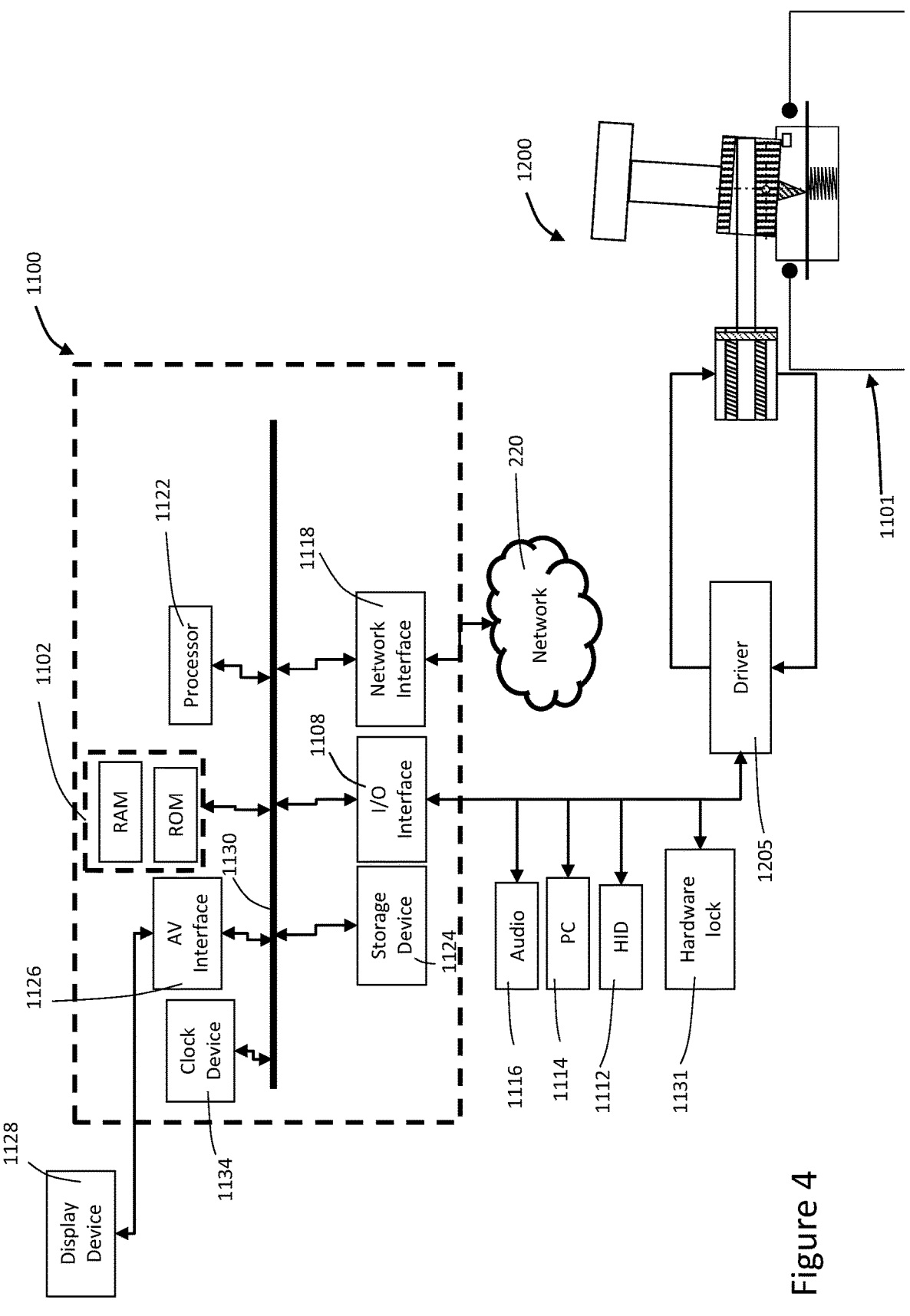
FIG. 4 shows a schematic diagram of a shutdown switch, including a switching device.

FIG. 4 shows a shutdown switch 1100 according to a further aspect of the invention. The shutdown switch 1100 comprises semiconductor memory 1102 comprising volatile memory such as random access memory (RAM) or read only memory (ROM). The memory 1102 may comprise either RAM or ROM or a combination of RAM and ROM.

It is envisaged that the shutdown switch 1100 could in itself be a computing device 200 on which the ransomware mitigation system can be installed.

The shutdown switch 1100 further comprises I/O interface 1108 for communicating with one or more peripheral devices. The I/O interface 1108 may offer both serial and parallel interface connectivity. For example, the I/O interface 1108 may comprise a Universal Serial Bus (USB) or similar I/O interface for interfacing with a switching device 1200 as detailed below.

The I/O interface 1108 may also communicate with one or more human input devices (HID) 1112 such as keyboards, pointing devices, joysticks and the like. The I/O interface 1108 may also comprise a computer to computer interface 1114 similar to the computing device 200, for interfacing the computing device 200 with one or more remote or external computing devices 200. The I/O interface 1108 may also comprise an audio interface 1116 for communicate audio signals to one or more audio devices (not shown), such as a speaker or a buzzer.

The shutdown switch 1100 may also comprise a network interface 1118 for communicating with one or more computer networks 220, in order to communicate with the ransomware mitigation system 1000, if the code for the ransomware mitigation system is located on an external computing device 200 it is envisaged that the code for the ransomware mitigation system may be located on the shutdown switch 1100 itself.

The network interface 1118 may be configured for communication with a wired network, and may include a networking card for connection to a wired Ethernet™ network. The network interface 1118 can also be configured for wireless communication via, for example a wireless communication card that is configured for communicating over a wireless network, such as a Bluetooth™ network or IEEE 802.11 network. The networking interface 1118 can further be configured for connecting via a hardwire such as an ethernet cable to a wireless router 240. The network 220 may be a local area network (LAN), such as a home or office computer network, or a wide area network (WAN), such as the Internet or private WAN.

The device 200 comprises an arithmetic logic unit or processor 1122 for performing the computer program code instructions. The processor 1122 may be a reduced instruction set computer (RISC) or complex instruction set computer (CISC) processor, or any other suitable processor. The computing device 200 further comprises a storage device 1124, such as a magnetic disk hard drive or a solid state disk drive, for storing of data and/or software instructions.

The shutdown switch 1100 may also comprise a video interface 1126 for conveying video signals to a display device 1128, such as a liquid crystal display (LCD), cathode-ray tube (CRT) or similar display device.

The shutdown switch 1100 may also comprise a communication bus subsystem 1130 for interconnecting the various devices described above. The bus subsystem 1130 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

The shutdown switch 1100 is configured to be connected into a circuit 1101, preferably including a plug socket 1109 so that the plug of a computing device can be inserted into the socket The shutdown switch 1100 also preferably includes a clock device 1134 which it may use to obtain the current time.

The shutdown switch 1100 also preferably includes a hardware lock 1131. The details of the hardware lock 1131 are set out in more detail below.

The shutdown switch 1100 also includes a switching device 1200. The switching device 1200 is configured to open the circuit 1101 on actuation by the processor 1122. Actuation of the switching device 1200 to open the circuit 1101 may be carried out in a wide variety of ways. These will be explained with reference to FIGS. 5 to 7 below.

Figure 5:
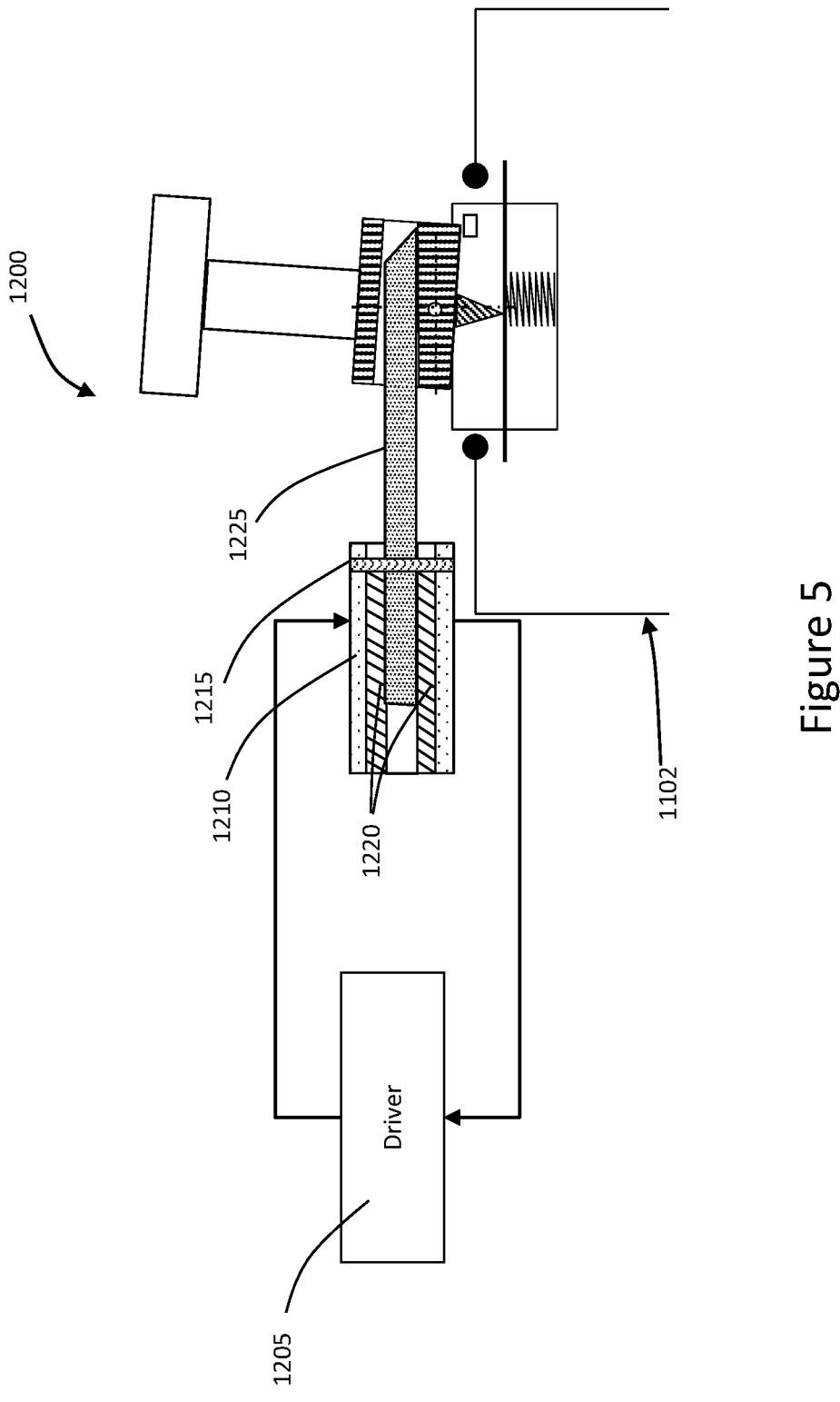
FIG. 5 shows a schematic cutaway side view of a switching device showing the over centre switch locked in place in an open condition.

A close up of one embodiment of the switching device is shown in FIG. 5.

Figure 6:
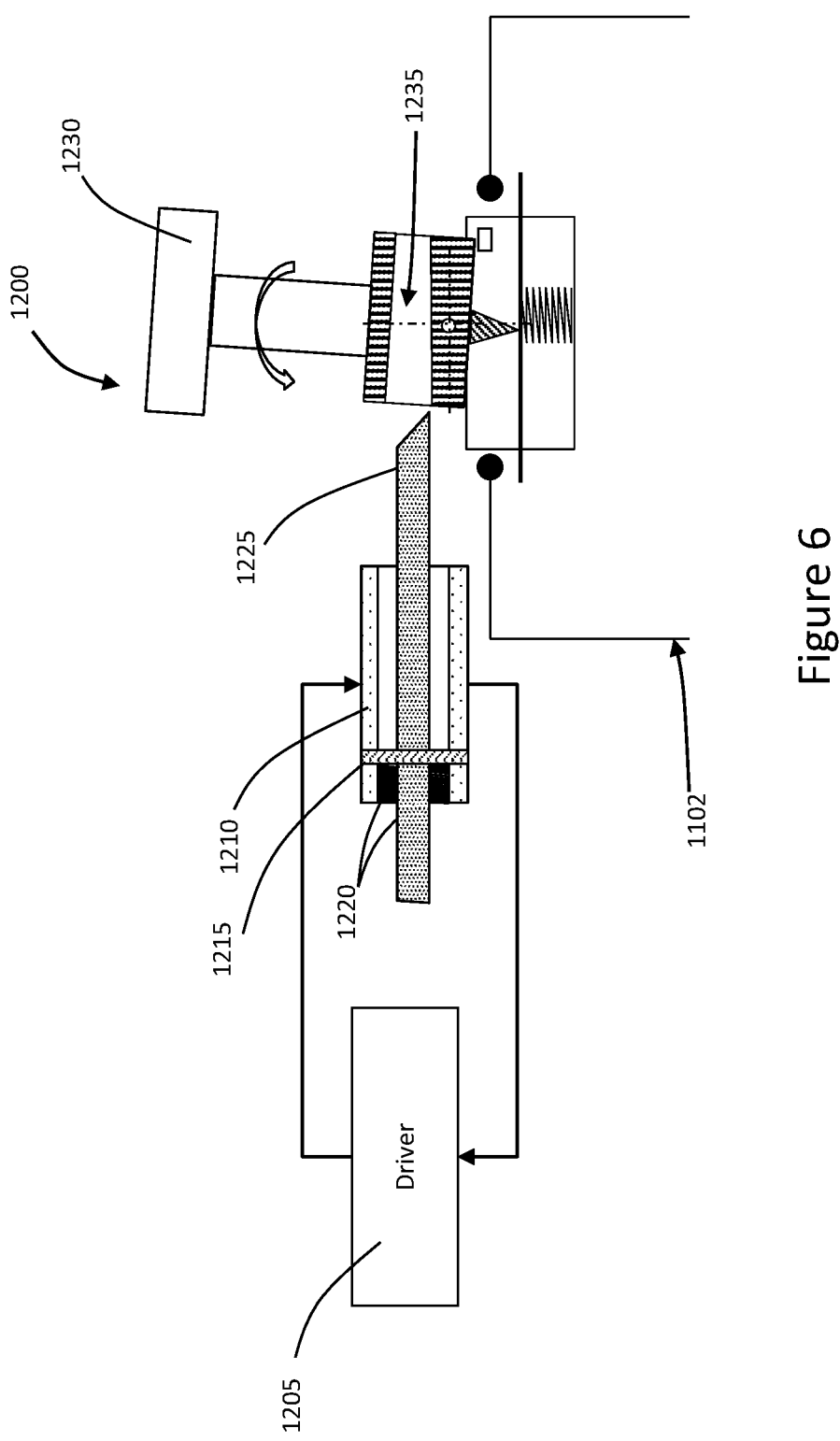
FIG. 6 shows a schematic cutaway side view of a switching device showing the over centre switch in an open condition, but movable to a closed condition.

The switching device 1200 includes a driver 1205 or controller that is actuatable by the I/O interface 1118. On being actuated, the driver causes current to flow in a circuit 1101 to actuate solenoid 1210. The solenoid 1210 acts on flange 1215 against the biasing action of a spring 1220 to move shaft 1225. The switching device 1200 further includes a spring loaded over-centre switch 1230. When the solenoid 1210 is not energised, the spring 1220 pushes against the flange 1215, which is connected to the shaft 1225 to push shaft 1225 into a receiving formation 1235 on the overcentre switch, thereby moving the overcentre switch to its open position, as seen in FIGS. 5 and 6, and cutting power to the computing devices 200. When the shaft 1225 is inserted into the receiving formation 1235, the overcentre switch is preferably not movable to its closed position. This ensures that the switch cannot just be switched back on to allow the ransomware to continue causing damage.

Figure 7:
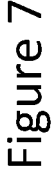
FIG. 7 shows a schematic cutaway side view of a switching device showing the over centre switch in a closed condition.

The solenoid 1210 is ordinarily kept energized, and acts to move the shaft 1225 against the action of the spring 1220, thereby removing the shaft from the receiving formation. When the shaft is withdrawn or removed from the receiving formation 1235, the overcentre switch is movable to its closed position as shown in FIG. 7. When the overcentre switch is in its closed position, current is able to flow from the plug socket 310 to the connected computing devices via the plug socket in the shutdown switch 1100.

The above embodiment is one of many ways that the switching device 1200 could be configured. For example, the solenoid 1210 may ordinarily hold the switch closed directly, and the controller could cause a break in the electrical power to the solenoid to cause the circuit 1101 to be opened.

Preferably the switching device 1200 is configured as a fail to safe, whereby any break in power will cause the switching device 1200 to open the circuit 1101. In this regard, it is envisaged that the shutdown switch 1100 will be configured for receiving a confirmation signal from the ransomware mitigation system. The confirmation signal could be a continuous signal, or could be an intermittent an intermittent signal at regular time intervals. In the event that a confirmation signal is not received, or is not received at an expected time interval, the processor will actuate the driver 1205 of the solenoid 1210 to stop power electrical current moving through the solenoid 1210. This will cause the spring 1220 to move shaft 1225 into the receiving formation 1235, thereby causing the over centre switch 1230 to move to an open condition in which power to the circuit 1101, and hence computing devices 200, is cut off. It is further envisaged that the shutdown switch 1100 can include a reset mechanism or button (not shown). The reset mechanism may be physically manipulable to reset current flow to the solenoid, thereby allowing a reset of the switching device 1200, and allowing current to flow to the computing devices 200 and/or the shutdown switch 1100. For example, the reset mechanism may be a lever that allows the solenoid to be pushed back against the action of the spring 1220, thereby allowing the switch over centre switch 1230 to be moved to the closed position.

Figure 11:
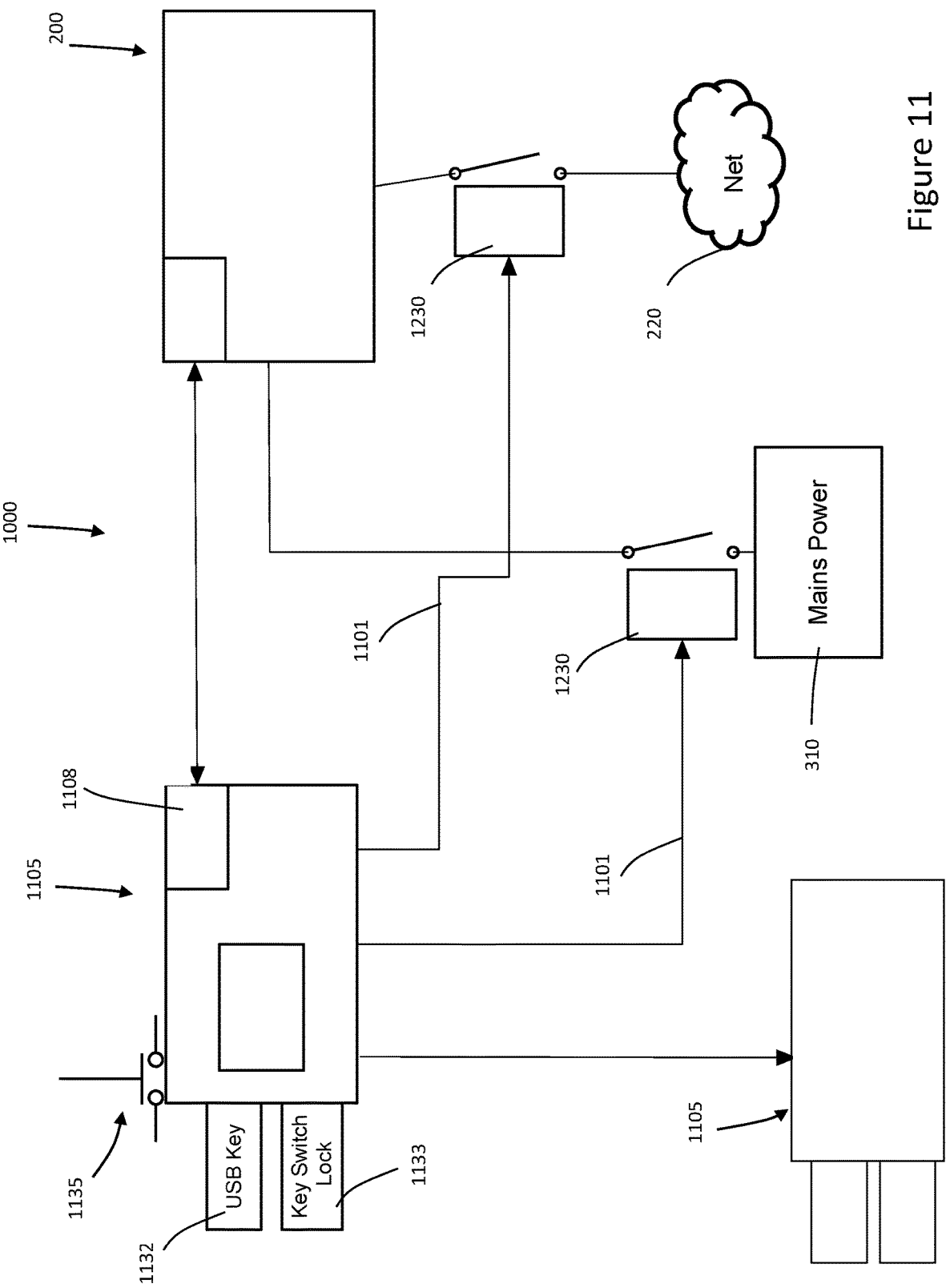
FIG. 11 shows a schematic view of a ransomware mitigation system.

It will be appreciated by person skilled in the art that wide variety of embodiments of shutdown switches 1100 may be possible. A further embodiment of a shutdown switch 1100 is shown in FIG. 11, wherein the switching device 1200 itself is a solid-state relay 1230. Such a solid-state relay 1230 does not include moving mechanical parts, and uses electronic junctions for switching.

The shutdown switch 1100 includes an electronic appliance portion 1105 that may include all of the features as described above with reference to the previous embodiment of the shutdown switch 1100. In this embodiment, however, the shutdown switch 1100 includes a USB socket for receiving a USB key 1132, but could be any other suitable connector or key, such as a card key. The USB key operates as a software lock, instead of the hardware lock 1131 described above. The shutdown switch 1100 further includes a key switch lock 1133 that is configured to receive a physical key that is operable to open and/or close a circuit, and operates as a hardware lock 1131. Either of these USB key 1132 and/or key switch lock 1133 can be used to override the protective features of the ransomware mitigation system for maintenance and/or updating and/or administration. It is envisaged that alternative physical key units could be provided such as a card key, USB device, or other inserted device. It is envisaged that the physical The electronic appliance portion 1105 is configured with an input/output interface 1108, preferably in the form of a USB connection or any other suitable interface, for communicating with a protected computing device 200 in order to monitor the rate of modifications of digital files on that computing device.

It is envisaged that the communication between the electronic appliance portion 1105 and the "monitoring" computing device 200 is synchronised bidirectional data communications with encryption and anti-tamper features. The electronic appliance portion 1105 is further connected via circuit 1101 to solid-state relays 1230. The solid-state relays can be used to disconnect the computing device 200 from both the source of power, for example at plug socket 310, and/or to disconnect the computing device from the network 220 that it is connected to in a disconnection event. In addition, it is envisaged that the electronic appliance portion 1105 can be connected to other electronic appliance portions, to be able to actuate them to actuate the shutdown, thereby causing a cascading shutdown effect.

The electronic appliance portion 1105 is also provided with a physical reset switch 1135, by which the ransomware mitigation system can be reset to allow the computing device 200 to be reconnected to the mains power and/or computer network. In this regard, it is envisaged that a separate independent reset network and/or power supply may be provided to this end. The reset switch 1135 may also function as a power panic button, and operating the reset switch 1135 when the system is operating may cause the processor to shut power and/or network connectivity to all of the computing devices that it is monitoring.

It will further be appreciated by person skilled in the art that a shutdown switch as described could be housed internally of a computing device 200, for example as an extension of a computer's power supply, or alternately as additional specialised hardware which can be mounted internally in a system. Further, the switching devices (whether mechanical or electronic) could be incorporated within existing power switches, uninterruptible power supplies (UPS) and/or network routers 240. The solid-state relays can in turn be incorporated within the shutdown switch, as will be described below.

It is further envisaged that the shutdown switch 1100 can also operate as a panic button, for example as indicated by switch 1230 in FIG. 7, which can be operated by a user to open the circuit and cut power to the power supply; cut power to a network router; and/or disconnect the computing device(s) 200 from the network. Such a panic button could be set up to secure a network and kill power to the core computing devices 200 in a network.

Further, while the description above shows shutdown switches that operate to open a circuit to thereby cut power, it will be appreciated by persons skilled in the art that a shutdown switch could also be used to close a circuit in order to accomplish a similar effect. For example, closing a switch can act as a signal to other external hardware to carry out an action such as interrupting the power. For example, an external UPS could be signalled to interrupt power to computing devices, a router, or similar to a power distribution box.

Figure 14:
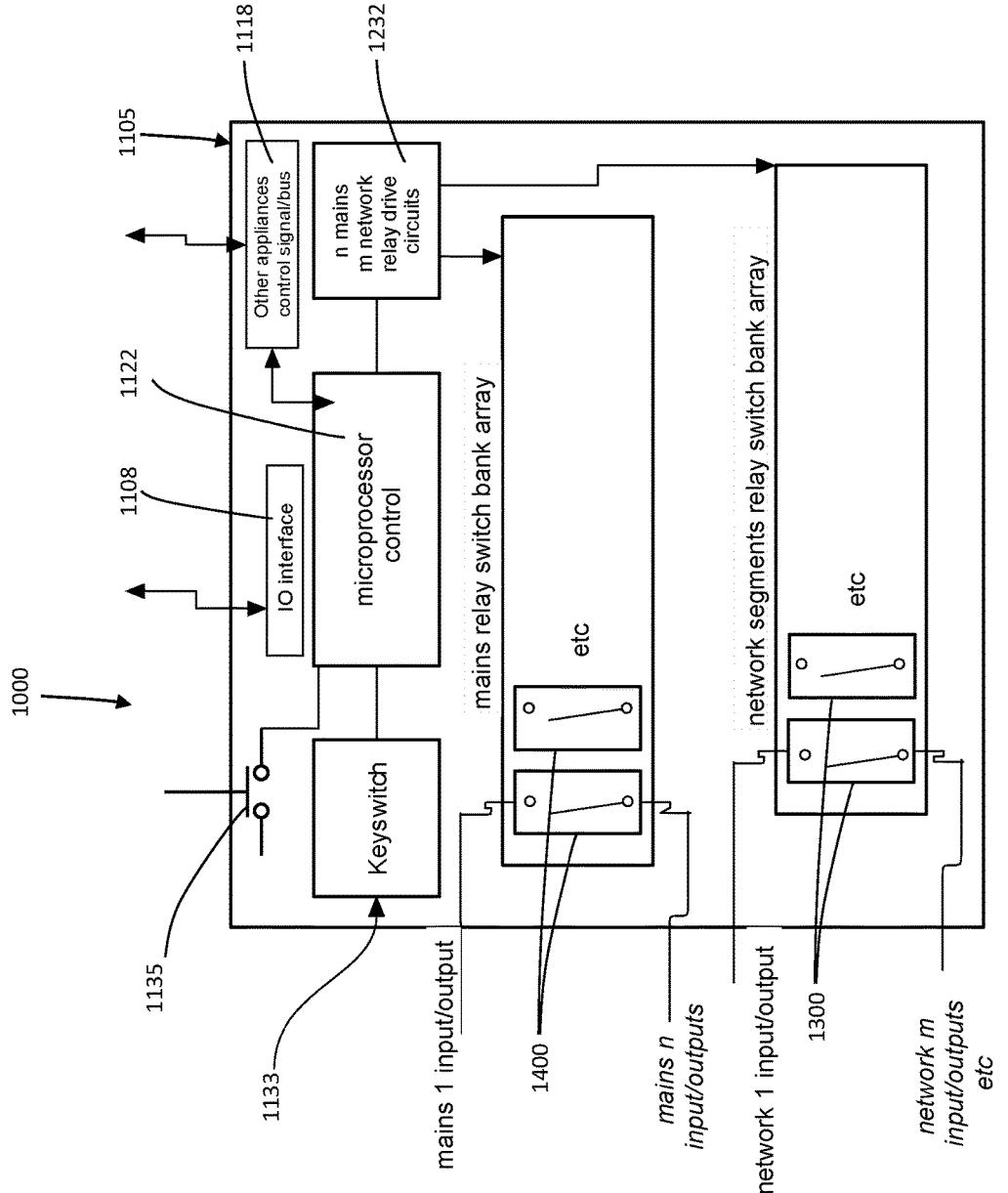
FIG. 14 shows a schematic view of a second embodiment of a ransomware mitigation system.

Another embodiment of a shutdown switch 1100 is shown in FIG. 14. The shutdown switch 1100 includes a bank or array of mains relay switches 1400. Each of the mains relay switches 1400 is controlled by a processor 1122. Cables for power input and power output can be connected to opposed sides of each of the mains relay switches 1400. Alternately, a single cable may be provided for mains power input, while a plurality of cables may be provided for mains power output. It will be appreciated by person skilled in the art that the use of relays for control is well known, and power flow through the mains relay switches 1400 may be controlled by the processor in a known fashion, for example through the use of relay drive circuits 1232. A discussion of the details of the power relay switches 1400 is considered beyond the scope of the present specification.

Shutdown switch 1100 is further provided with a physical key such as a key switch lock 1133 that can be used to gain control and operate restricted maintenance functions at the hardware unit when a person is present in person. Such a physical key can also be a card key or other inserted device such as a USB device or similar security device. Such a physical override can be used to also boot a switched protected endpoint device in an unprotected state until protection can be activated.

The I/O interface 1108 on the hardware unit is preferably configured for a high-frequency time—domain synchronised bidirectional authentication exchange of coded messages between the protected endpoints (i.e. computers) and the hardware unit, and between the hardware units themselves.

The microprocessor may be configured for controlling or sending transmissions to other appliances or electronic appliance portions 1105 via a network interface 1118 through which control signals can be routed. Preferably network interface 1118 is used to connect the hardware unit or electronic appliance portion 1105 to other similar hardware units in a separate network from the network that the monitored computing devices are on. Such a network may be wired or wireless. Further such a network between hardware units may be a local area network or a wide area network. However, it is envisaged that if it is a wide area network (for example using the Internet) then such communication will be highly secure and preferably utilizing a virtual private network (VPN) or similar. It is also envisaged that the hardware units may make use of a wide area network separate from the Internet, such as a satellite based network, for communications between them.

The network interface can also be used to communicate with a monitoring transceiver on the computing device associated with the monitoring software in another separate independent network that is independent from the network that the computing devices being monitored is connected to.

In this way, the hardware unit is connectable to other hardware units and/or to the monitoring software on the computing device in a connection network separate from the local area network (LAN) or network enterprise being protected, and communication can still be sent between hardware units even when the network communications have been shut down or power cut to the computing devices on which the files are being monitored.

Network interface 1118 allows hardware units to communicate between each other and with the software monitoring portion of the computing device being monitored, independently of the network files and traffic being monitored, and on a separate network. This allows for the carrying out of heuristic decisions as a hardware group, and as an individual hardware unit. Such decisions would be based on each hardware unit's individual data received and feedback from the monitoring software units on the protected endpoints (computing devices, routers, etc). The independent communication between the hardware units is preferably not affected by the shutdown of the computing devices and/or the network being monitored. This allows hardware units to communicate their actions and track intrusions more accurately to prevent intrusions propagating through larger enterprises.

It is envisaged that a hardware unit will preferably be provided for each subnet in a network. This is anticipated by the Applicant as being able to more efficiently restrict propagation of ransomware through an enterprise network.

In addition, the microprocessor may be configured for receiving control signals from other appliances 1105, instructing the processor to cut power and/or network communications to computing devices that it is monitoring/protecting/responsible for/in control of.

It is further envisaged that any of the relays/switches could, in addition and/or alternatively to cutting power to protected devices and/or other hardware units, also switch on alternative power supplies or connect power to devices that can be used as backup infrastructure when attacked computing devices have been powered down.

It is further envisaged that any of the relays/switches could, in addition and/or alternatively to cutting network communications to or from devices being attacked, also connect alternative networks as backup network infrastructure.

For example, if a server farm serving a wide area network of computing devices is attacked, the system could cut power to the server farm while disconnecting it from the Internet. At the same time, an alternative server farm may be powered on and connected to the Internet. At the same time, any personal computers, routers, hubs, switches, or WAN equipment that have been identified as the source of the threat can be powered down and/or disconnected from the network.

In this way, the hardware units and associated software units on the protected endpoints act as a circuit breaker that prevents propagation of ransomware through a network such as an enterprise network, while at the same time allowing for enterprise functionality to be retained.

Further, it is envisaged that the monitoring portion associated with the computing device being monitored can include its own monitoring transceiver, or it can make use of a transceiver on the computing device being monitored in Order to communicate with the hardware unit.

Network Shutdown Switch

It is further envisaged, and as exemplified in FIG. 14, that the shutdown switch 1100 will be configured for actuating the disconnection of the network connection that the computing devices 200 have to the communications network 300. As may be seen from FIG. 14, the shutdown switch 1100 includes a bank or array of network relay switches 1300, wherein a plurality m of network cables can be connected as inputs and outputs, and the processor 1122 is configured for controlling the individual network relay switches 1300. Such network relay switches 1300 could be physical relays and/or solid-state relays. Further, it is envisaged that a single network cable input may be provided, while a priority of network cable outputs may be provided, for example in a one to many configuration: or a many to many configuration.

By controlling the network relay switches 1300, the processor 1122 can allow or prevent network communication to particular computing devices 200. It is envisaged that, on detection of activity that meets the threshold limit, the processor will determine which computing devices 200 the activity is on, and cut network communications to those computing devices. It is envisaged that doing so will assist in the prevention of the spread of the ransomware attack to other computing devices.

As described above, the processor may simultaneously cut mains power to those computing devices 200 in order to mitigate the number of lost or damaged files on those computing devices.

It is envisaged that the disconnection of the network connection can be actuated by physical means or virtual means (i.e by software). Further, disconnection of the network connection can be caused by opening a network circuit, or by shutting power to a network device such as a router, network card or the like.

Functionality

Machine Learning

It is envisaged that the ransomware mitigation system 1000 will preferably make use of an artificial intelligence (AI) model to establish what the threshold activity limit should be that would cause the ransomware mitigation system 1000 to actuate the shutdown process described above. It is envisaged that the artificial intelligence model could be trained using machine learning, deep learning and/or a neural network to learn what typical activity would be for the computing device and/or network of computing devices. By training the AI model, this would in effect develop a set of rules or activity profiles or patterns of activity for a given number of users, time of day, dates, number of modifications on a single process, connecting IP addresses, originating communicating locations, et cetera. In one embodiment, a neural network may be trained on historical data of file modification on the network that it will be monitoring to generate a neural model. The historical data could take into account any of the factors mentioned above, including:

a. number of users;

b. time of day;

c. rate of modifications;

d. total number of modifications of files in a single process;

e. local intrusion attempts;

f. connecting internet protocol (IP) addresses;

g. originating communication locations; and h. any other suitable data.

This would establish a baseline of ordinary usage of that network for given parameters.

The trained neural model could then be used to establish what the predetermined activity threshold or activity profile should be at any given time and date, taking into account the level of activity, number of users, et cetera on the computing device and/or network. Such an activity threshold could also be in the form of a range of activity for given parameters. Activity not fitting the rules or activity profiles that have been learned as being normal would then be red flagged during the monitoring of the file modifications and network activity by the ransomware mitigation system.

It is further envisaged that an AI model need not be used, and that instead a predetermined activity threshold could be set as a hard rule. For example, where more than a certain threshold number of files are being encrypted, deleted or otherwise modified in a given amount of time on any one computing device, or on a collection of associated computing devices, this may trigger actuation of the shutdown of those computing devices as described below.

Monitoring

Figure 8:
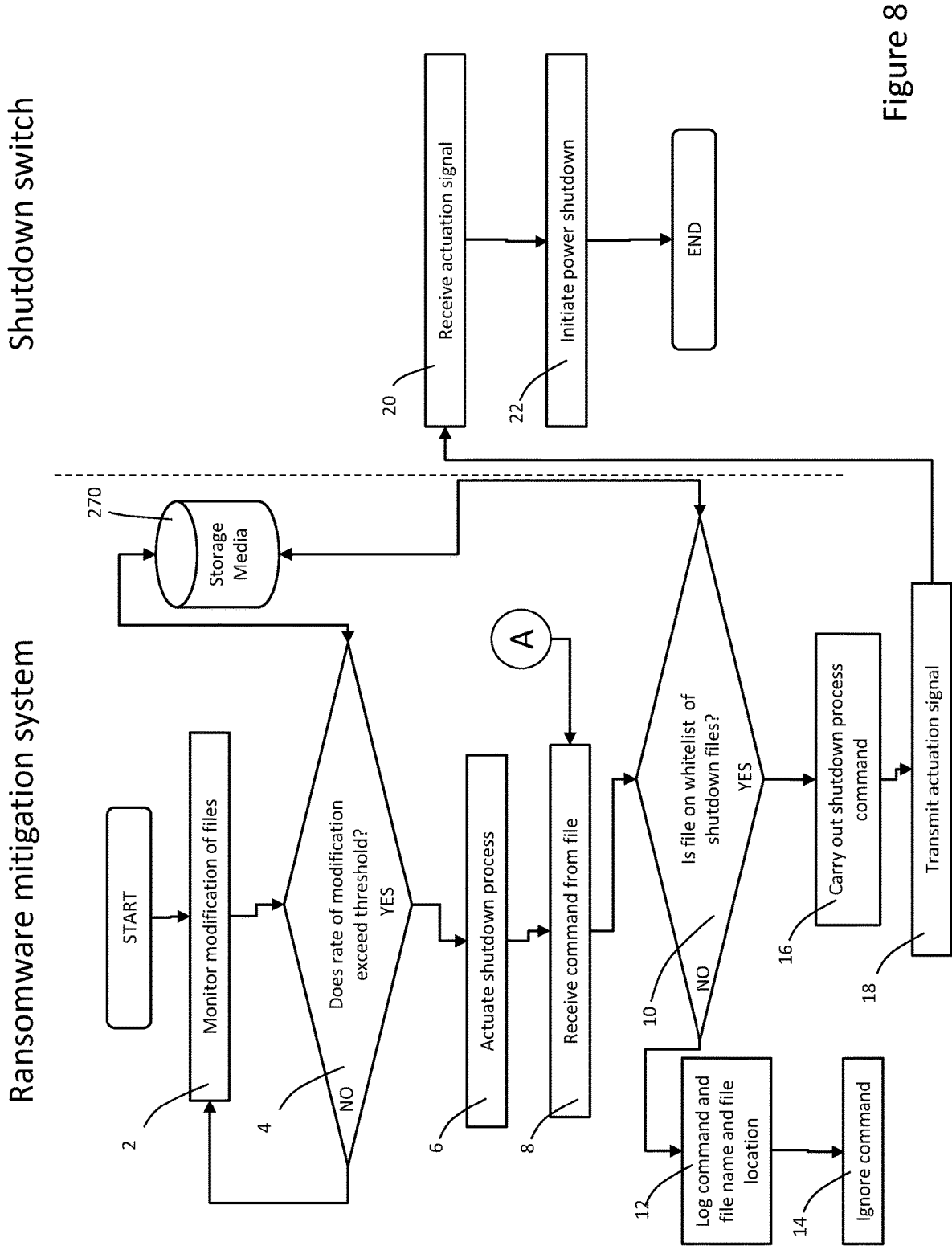
FIG. 8 shows a swim lane flow chart showing a first embodiment of a method for mitigating damage caused by ransomware.

The functionality of the ransomware mitigation system 1000 will now be described below with reference to FIGS. 8, 15 and 16.

During normal operation of a plurality of competing devices 200 in a computer network, for example such as at an office building (not shown), workers at the various computing devices 200 may be causing the modification of digital files on their computing devices through normal work. It is envisaged that at this stage, the ransomware mitigation system 1000 will be monitoring 2 the files that are being modified. Monitoring of the files can include monitoring of wide variety of characteristics, including:

a. the number of modifications carried out on a file within a given time period, b. the number of files being modified within a given time period, c. the number of users logged in to the network;

d. the time of day;

e. the date;

f. the total number of computing devices in use;

g. the type or nature of the files being modified;

h. local intrusion attempts;

i. connecting internet protocol (IP) addresses;

j. originating communication locations;

k. or any other characteristic.

In addition, the ransomware mitigation system 1000 may be receiving details of emerging risk management data from online resources, such as databases of the latest ransomware types, the files that they attack, and how they operate.

It is envisaged that the ransomware mitigation system 1000 can include a monitoring software portion that is associated with a computing device (the "monitoring machine" 200*c*), as well as a shutdown switch 1100.

In an alternative embodiment, it is envisaged that the monitoring software portion need not necessarily be separate from the shutdown switch 1100, and the shutdown switch itself could function as a dedicated monitoring machine with its own monitoring software portion.

Monitoring of the files is described below will preferably be carried out by the monitoring software portion, which is typically embodied as software instructions on digital storage media.

Ransomware or similar intrusive programs may be inadvertently downloaded and self actuate, or hostile users may access the network using a true user name and password that they may have obtained, and start making modifications to large numbers of files. Such modifications could include encrypting, deleting, copying, amending, or any other modifications. Once such a large number of modifications to the files is being carried out, the ransomware mitigation system 1000 will determine 4 whether the monitored rate of modifications to the digital files meets a predetermined activity threshold. In determining whether the monitored rate of modifications meets the predetermined activity threshold, the ransomware mitigation system 1000 can take into account any of the characteristics outlined above. In monitoring the rate of modifications, the ransomware mitigation system they monitor the modified file timestamp present on the file record of the digital files.

For example, if it is 2:00 am in the morning, or over the weekend, a lower number of files being modified may meet the room quiet activity threshold, compared to for example 2:00 µm in the afternoon. Further, if a large number of files are being modified by a smaller number of logged in users, then the predetermined activity threshold may be lower than if a large number of files being modified by a larger number of logged in users. In addition, the ransomware mitigation system 1000 may take into account the nature of the files that are being modified. High value files such as PowerPoint files or similar presentation files, MS Word or similar word processing type documents, PDF documents, computer aided design (CAD) drawings, source code files, or the like may be given a higher level of importance if they are being modified, relative to easily replaceable files such as system files.

In determining whether an activity threshold has been exceeded or met, the ransomware mitigation system 1000 may allocate a weighting to various factors in order to establish what the activity threshold should be.

It is envisaged that optionally, a backup copy of the files being modified may be created if the predetermined activity threshold is being approached, or has been exceeded. In this way, further mitigation of the damage caused by ransomware can be provided. It is further envisaged that optionally an alert signal may be generated, for example in the form of an email to technical support requesting assistance.

Once a predetermined activity threshold has been met and/or exceeded, the ransomware mitigation system 1000 will then actuate 6 a force shutdown of the computing devices that it is monitoring.

In one embodiment, it is envisaged that the ransomware mitigation system 1000 will actuate 6 a forced shutdown of the computing devices by actuating a shutdown process in the one or more computing devices, wherein the shutdown process cannot be overridden, even by a user with administrator rights. In an alternative embodiment, instead of forcing a shutdown, the ransomware mitigation system 1000 may merely cause the seizure of the operating system, for example by causing a forced exception interrupt on the operating system on at least the affected computing devices, and preferably all of the computing devices in the network.

It is envisaged that the actuation 6 of such a shutdown command will cause the computing devices to cease all other processes except shutdown processes. In one embodiment, the ransomware mitigation system 1000 will store a whitelist of shutdown files that are part of the shutdown process, and only such files will be allowed to operate on actuation of the shutdown command. Preferably, the ransomware mitigation system 1000 will generate an encrypted backup copy of the whitelisted files.

Once the forced shutdown has been actuated 6, any further command received 8 from any file is then checked 10 to establish whether the file that the command has been received from is on the whitelist of shutdown files. If the file is not on the whitelist, then the ransomware mitigation system 1000 will log 12 the command, the filename and preferably the file location, and then ignore 14 the command. If the file that the command is received from is on the whitelist, then the ransomware mitigation system 1000 will carry out 16 the shutdown process command. The shutdown process command could include the disabling of the operating system of the computing device 200 and/or the ransomware mitigation system 1000 as described below.

It is envisaged that the ransomware mitigation system 1000 will prevent modification of any of the white listed files, even by administrators, without the hardware lock 1131 or key switch lock 1133 being inserted and configured to allow modification of the whitelisted files. Preferably, if the ransomware mitigation system 1000 detects that any of the files on the whitelist are modified without the hardware lock and/or key switch lock being configured to allow such modification, the ransomware mitigation system 1000 will restore the original file from the encrypted backup copies.

Preferably, the ransomware mitigation system will then transmit 18 an actuation signal to the shutdown switch 1100. On receiving 20 the actuation signal, the shutdown switch 1100 will then initiate a power shutdown of the computing devices by opening the circuit 1101 as described above.

In an alternative embodiment as shown in FIG. 9, instead of transmitting an actuation signal, the ransomware mitigation system 1000 will stop transmission 24 of a confirmation signal. The shutdown switch 1100, on determining 26 that the confirmation signal has stopped, will then initiate a power shutdown of the computing devices 200 by opening the circuit 1101 as described above.

The ransomware mitigation system will include various details of the computing devices 200 that it is monitoring, including details of their IP address, as well as the shutdown switch 1100 that it is associated with, and from which it receives electrical power. The shutdown switch 1100 will have a network IP address itself. It is further envisaged that, when a predetermined activity threshold is being approached, or has been met or exceeded, the ransomware mitigation system 1000 will establish which shutdown switches 1100 are associated with the computing devices that are approaching or exceeding the activity threshold. Once the activity threshold has been met or exceeded, the ransomware mitigation system 1000 may only cause a power shutdown in those shutdown switches 1100 associated with the computing devices 200 that are at risk.

It is further envisaged that, as an additional safety, and as part of the shutdown process, preferably all users on the network will be logged out of access to the computing devices 200 that they are logged into, and all network communication will cease.

Figure 12:
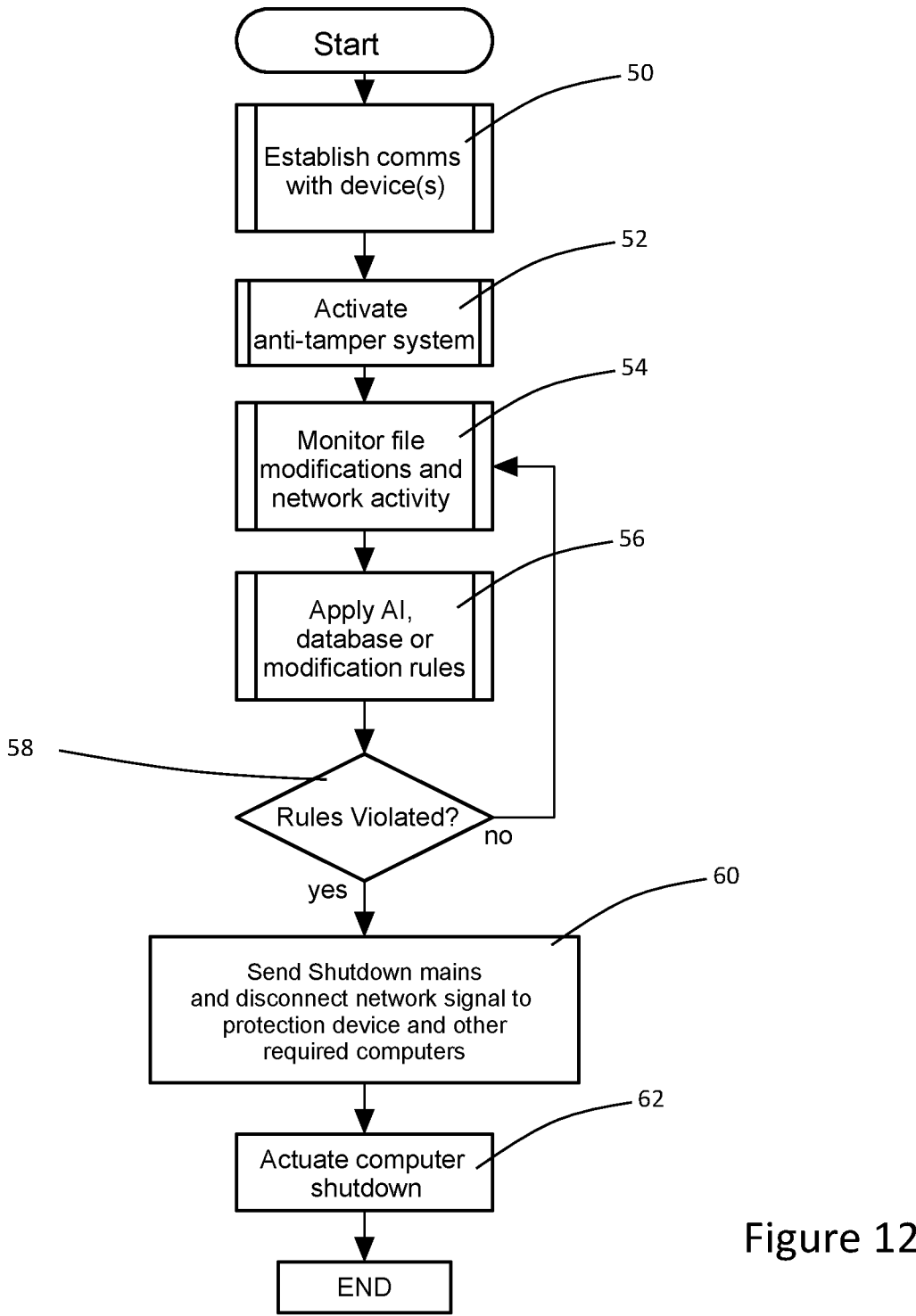
FIG. 12 shows a fourth embodiment of a flow chart of a method for mitigating damage caused by ransomware.

Another flowchart of the ransomware mitigation system core functions is shown in FIG. 12. Initially, the ransomware mitigation system 1000 will establish 50 communications with the computing devices 200, and activate 52 the processes for preventing tampering, as will be described in more detail below. The ransomware mitigation system 1000 will then monitor 54 the modification of digital files on the computing devices 200, and preferably also monitor network activity, including all the metrics on which the predetermined thresholds have been calculated, and/or AI model has been trained. As the ransomware mitigation system monitors 54 the file modifications and network activity, it applies 56 the rules and/or profiles and/or algorithms that have been created as rules, comparing 58 the metrics of the present file modifications and/or network activity to the rules and/or AI models, in order to establish whether a threshold of file modification activity has been exceeded. If, on comparing 58 the metrics to the rules, it finds that the rules have been violated, the ransomware mitigation system 1000 will send 60 a signal for the shutdown of power from the power mains, and preferably disconnect the computer devices 200 from the network. The ransomware mitigation system will then also preferably actuate 62 the shutdown of the computer.

Tamper Prevention

Figure 10:
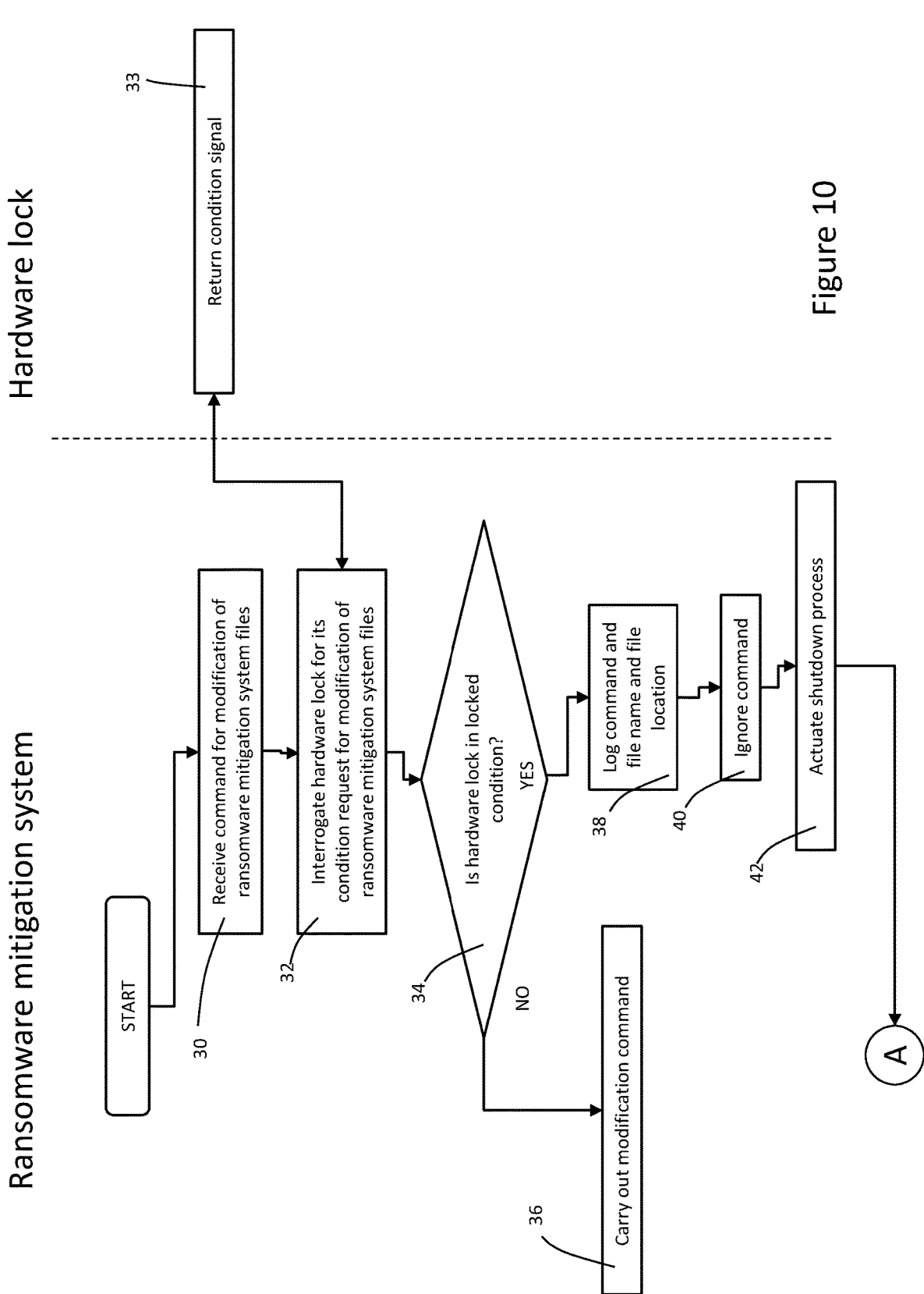
FIG. 10 shows a swim lane flow chart showing a third embodiment of a method for mitigating damage caused by ransomware.

Now described with reference to FIG. 10, the ransomware mitigation system 1000 will also be configured for detecting tampering or attempted modification of any of the ransomware mitigation system files. The ransomware mitigation system 1000 will monitor its own system files in order to establish whether there is any attempt to modify or change these files.

In the event that a command to modify or change these ransomware mitigation system 1000 system files is received, the ransomware mitigation system will preferably be configured for actuating the shutdown of power to all of the computing devices being monitored by the ransomware mitigation system files. This will occur in a manner similar to that described above. This could be carried out by shutting off power to the computing devices 200 and/or ransomware mitigation system 1000, by locking out all processes except white listed shutdown processes, and/or by disabling the operating system of the computing devices 200 and/or ransomware mitigation system 1000.

Figure 13:
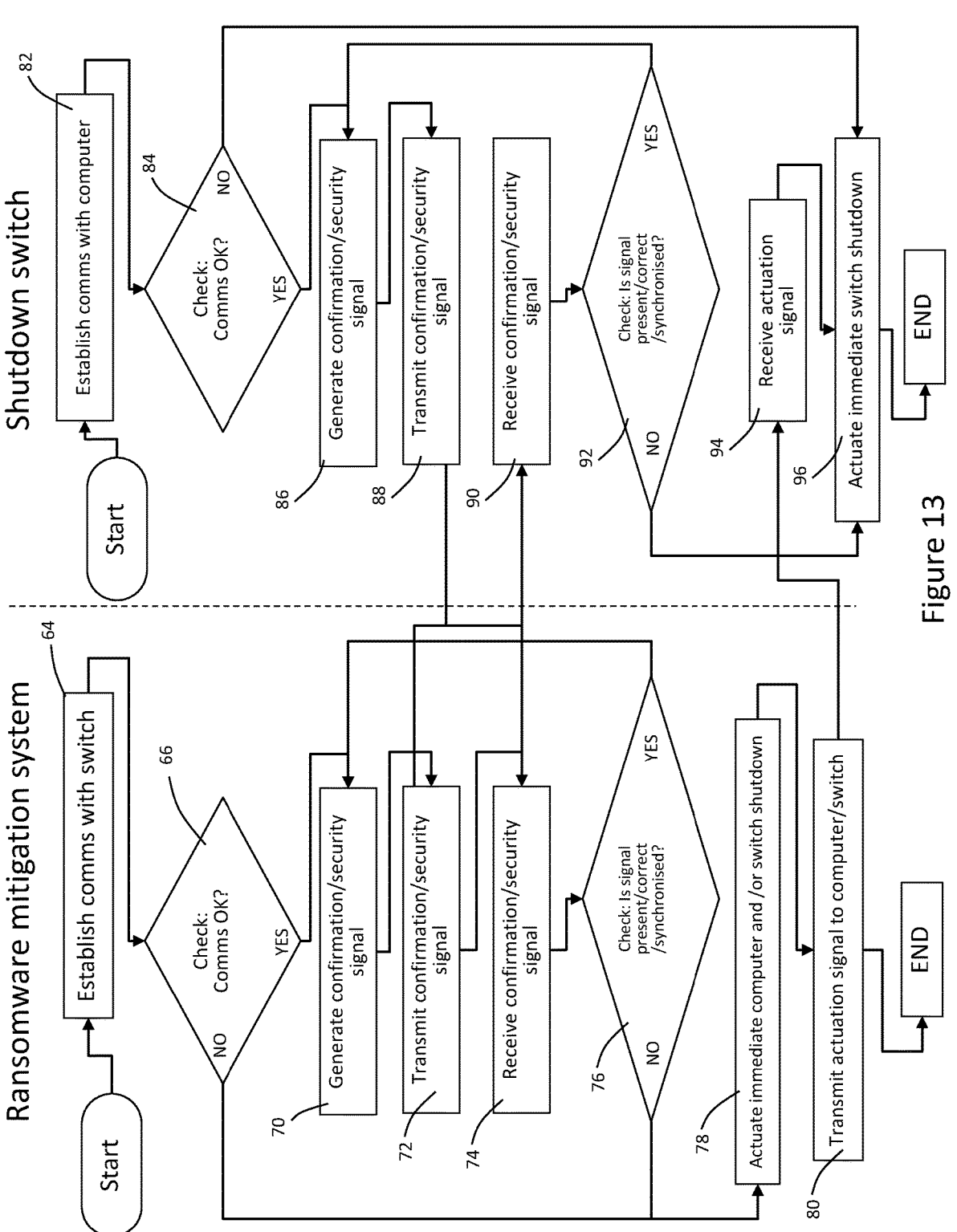
FIG. 13 shows a swim lane flow chart showing a method of preventing tampering with a ransomware mitigation system.

A further process for preventing tampering carried out by the shutdown switch 1100 and the monitoring portion of the ransomware mitigation system 1000 is now described with reference to FIG. 13. The shutdown switch 1100 and the monitoring portion will initially establish 64, 82 communications with each other. Each of the monitoring portion and the shutdown switch 1100 will then test 66, 84 to establish whether communications has been correctly established.

If communications has not been correctly established, the shutdown switch will actuate 96 a shutdown of the power and/or network communications, for example by actuating a solenoid switch or solid-state relay to open a circuit. It will be appreciated by person skilled in the art that the actuation of the shutdown could also occur by closing a circuit, for example to cause an additional device to shut off power to the computing device and/or shutdown switch. In addition, network communications can be shut down but disconnecting network connections as described above. It should be understood that where a reference to shutting down mains power to computing devices is described, this could be also include or be replaced by the disconnection of the computing device from the network it is on, unless the context makes it illogical.

It is further envisaged that the actuation of the shutdown could also occur after a predetermined time delay, thereby allowing time for the computing device 200 to shut down using its normal shutdown processes, however this is not preferred as this may result in additional information being lost to a ransomware attack.

If communications have not been correctly established between the monitoring portion and the shutdown switch 1100, the monitoring portion will also actuate 78 an immediate computing device 200 shutdown, by transmitting 80 an actuation signal to the computing device 200, and may optionally actuate the shutdown of power and network communications to other computing devices, in a cascading fashion. This may be by actuating the normal shutdown processes of the computing device 200 as described above, or by forced exception interrupt processing, effectively causing the computing device to cease all processes, and seizing the modification of files by the ransomware attack.

The monitoring portion may also, in addition, actuate 78 shutdown of the shutdown switch 1100 as a backup if the tamper prevention processes of the shutdown switch as described are not being followed. Actuation of the shutdown switch 1100 is caused by the transmitting 80 of an actuation signal to the computing device 200 and/or shutdown switch 1100. On receiving 94 the actuation signal, the shutdown switch 1100 will actuate 96 an immediate switch shutdown by cutting power to the switch and/or communication with the network.

If communications has been correctly established between the monitoring portion and the shutdown switch 1100, then the monitoring portion and the shutdown switch will enter into a cycle of generating 70, 86 a confirmation or security signal, transmitting 72, 88 the confirmation signal, and receiving 74, 90 the transmitted confirmation signal. It is envisaged that the monitoring portion and the shutdown switch 1100 will be configured to expect a particular confirmation signal within a particular time threshold and/or time range. The confirmation signal may also be encrypted. For example, if the monitoring portion transmits a confirmation signal to the monitoring portion, then it may expect an encrypted version of the hashed confirmation signal to be returned within 5-10 ms from the shutdown switch. Further, once the shutdown switch transmits the encrypted hashed confirmation signal to the monitoring portion, it may expect an encrypted version of the double hashed confirmation signal to be returned within 5-10 ms from the monitoring portion.

Each time that the confirmation signal is received 74, 90 by either the monitoring portion and/or the shutdown switch, it will be decrypted and checked 76, 92 against a hashed version of the last confirmation signal that was transmitted, in order to check 76, 92 whether the confirmation signal is present, correct and synchronised. In this way, a coded confirmation signal succession is established.

It will be appreciated by person skilled in the art that a wide variety of encryption methods and/or confirmation signals can be generated, transmitted, received and checked. Further, it will be appreciated that confirmation signals can be generated and transmitted simultaneously by both the shutdown switch and the monitoring portion.

In order for ransomware to succeed in tampering with the ransomware mitigation system, it will be required to take over control of at least one of the shutdown switch and the monitoring portion, establish what the coding succession pattern is for the confirmation signal, and ensure that a correct confirmation signal is generated and transmitted within the time threshold. Alternatively, the ransomware would need to take control over both of the shutdown switch and the monitoring portion to prevent the actuation of shutdown by either the shutdown switch and the monitoring portion. This timing requirement as an additional level of complexity that is required of a ransomware attack.

System Shutdown Protection

Figure 17:
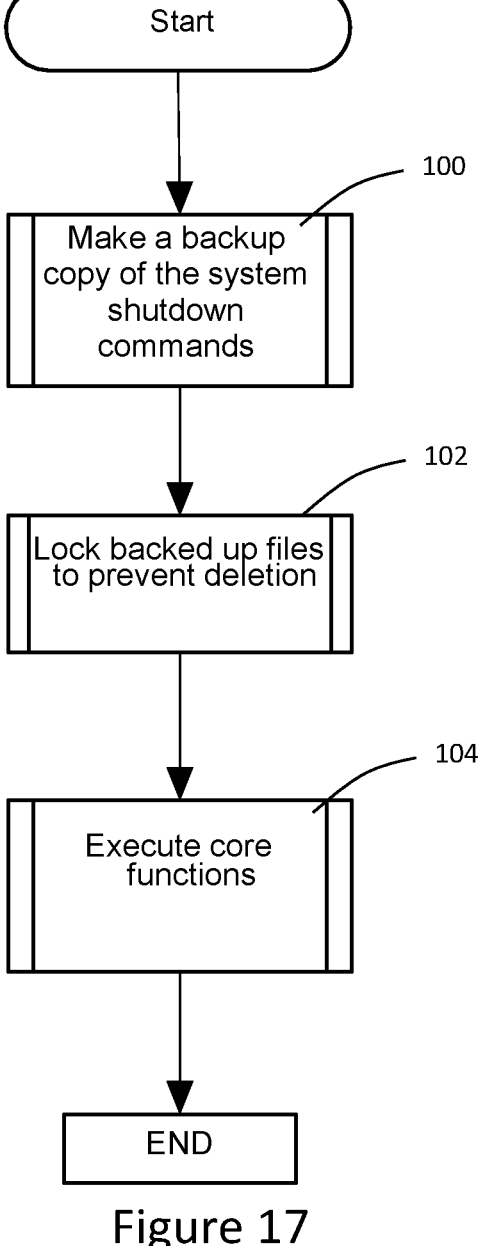
FIG. 17 shows a flow chart of a method of preserving system shutdown command files carried out by a ransomware mitigation system.

In addition to protecting the system files of the ransomware mitigation system, it is envisaged that the ransomware mitigation system will also be configured with a process for protecting the system shutdown files and processes of the computing devices themselves. Such a process is described now with reference to FIG. 17. Initially, on establishing that the levels of suspicious activity have passed the predetermined threshold, the ransomware mitigation system will make 100 a backup copy of the system shutdown command files. The backed up system shutdown command files will then be locked 102 in order to prevent deletion of the backed up system shutdown command files by a ransomware attack. The locked backup system shutdown command files could also be linked to a hardware lock as will be described in more detail below, wherein modification or deletion of the backed up system shutdown command files may only be allowed when the hardware lock allows such modification.

Should the original system shutdown command files be modified or deleted, it is envisaged that the ransomware mitigation system will retrieve the unmodified system shutdown command files from the backup, and overwrite the modified and/or deleted system shutdown command files, in order to allow the system to shut down using its ordinary processes.

Hardware Lock

In order to prevent unwanted modification of the ransomware mitigation system 1000 system files and/or the locked backup system shutdown command files, the ransomware mitigation system 1000 will preferably be provided with a hardware lock or physical unlocking device 231, 1131 that is physically movable between a locked condition and an unlocked condition. The hardware lock requires physical manipulation to an unlocked condition before any of the ransomware mitigation system files can be modified or changed.

Such a hardware lock could be in the form of a physical button that needs to be pressed, a lock and key type device requiring a specialised key, or any other similar device.

Preferably, the hardware lock includes an electrical circuit that can be interrogated by the ransomware mitigation system to establish its condition, wherein one of the locked condition and unlocked condition results in a signal that can be detected by the ransomware mitigation system, confirming its condition.

It is envisaged that on receiving 30 a request for modification of the ransomware mitigation system 1000 system files, the ransomware mitigation system 1000 will interrogate 32 the physical unlocking device to establish whether it is in a locked condition or an unlocked condition. The hardware lock will return 33 a condition signal indicative of whether it is in an unlocked condition or a locked condition. This condition signal could be a simple as being an null signal or a voltage signal.

If the hardware lock is in an unlocked condition, then the ransomware mitigation system 1000 will it will allow modification to the ransomware mitigation system 1000 system files by carrying out 36 the modification command or request. If the hardware lock is in a locked condition, then the ransomware mitigation system will log 38 the request for modification, together with the filename from which the request came and the file location. The ransomware mitigation system 1000 will then ignore 40 the command and actuate 40 to the shutdown process as described above.

Interpretation

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data," refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.
Connected Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

It will be appreciated that the methods/apparatus/devices/systems described/illustrated above at least substantially provide a ransomware mitigation system and method that will at least partially mitigate damage caused by ransomware.

The ransomware mitigation system and method described herein, and/or shown in the drawings, are presented by way of example only and are not limiting as to the scope of the invention. Unless otherwise specifically stated, individual aspects and components of the ransomware mitigation system and method may be modified, or may have been substituted therefore known equivalents, or as yet unknown substitutes such as may be developed in the future or such as may be found to be acceptable substitutes in the future. The ransomware mitigation system and method may also be modified for a variety of applications while remaining within the scope and spirit of the claimed invention, since the range of potential applications is great, and since it is intended that the present invention be adaptable to many such variations.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.
Local Area Network Any reference in this specification to a "local area network" or LAN shall be construed as referring to a network that extends over a localized area, and not to a specific protocol for communications. Such a local area network may be wired or wireless.
Wide Area Network Similarly, any reference to a "wide area network" or WAN shall be construed as referring to a network that extends over more than one location over a wide area, such as across a country, across continents, or extending worldwide, and not to a specific protocol for communications. Such a wide area network may be wired or wireless.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Chronological Order

For the purpose of this specification, where method steps are described in sequence, the sequence does not necessarily mean that the steps are to be carried out in chronological order in that sequence, unless there is no other logical manner of interpreting the sequence.

Markush Groups

In addition, where features or aspects of the invention are described in terms of Markush groups, those skilled in the art will recognise that the invention is also thereby described in terms of any individual member or subgroup of members of the Markush group.

INDUSTRIAL APPLICABILITY

It is apparent from the above, that the arrangements described are applicable to the software security industries.

The invention claimed is:

1. A ransomware mitigation system for mitigating damage done to one or more computing devices connected to a network from a ransomware attack, the ransomware mitigation system comprising:

a monitoring portion comprising:

digital storage media configured for storing data and/or instructions;

a processor operationally connected to the digital storage media and configured to be directed by instructions; and a monitoring transceiver operably connected to the processor for transmitting and/or receiving digital information;

wherein the processor is configured to be guided by the instructions to carry out the steps of:

monitoring a plurality of digital files on a network of at least one computing device for the rate of modifications carried out on the plurality of digital files;

determining whether the monitored rate of modifications meets a predetermined activity threshold; and maintaining bidirectional synchronous communication with a shutdown switch on a dedicated communications line by transmitting a confirmation signal, and at least one shutdown switch configured for:

shutting down, in a shutdown event, one or more selected from:

power to the at least one or more computing devices, and network communications to the at least one or more computing devices, and wherein the monitoring transceiver is configured for independent communication with the shutdown switch on a network independent of the network traffic on the network that the one or more computing devices are connected to, and wherein the shutdown switch is configured to actuate a shutdown event if an expected confirmation signal is not received as part of the bidirectional synchronous communication between the at least one or more shutdown switches and the monitoring portion.

2. The ransomware mitigation system as claimed in claim 1, wherein the processor is configured to be guided by the instructions to carry out the step of:

allocating a whitelist of shutdown files that are part of the shutdown process and only allowing whitelisted shutdown files to operate on actuation of the forced shutdown; and preventing modification of the whitelisted files during the forced shutdown of the one or more computing devices.

3. The ransomware mitigation system as claimed in claim 1, wherein the processor is configured to be guided by the instructions to carry out the step of:

actuating a forced shutdown of the one or more computing devices by actuating one or more shutdown switches, wherein actuation of the shutdown switch shuts off power to at least one or more of the one or more computing devices.

4. The ransomware mitigation system as claimed in claim 1, wherein the processor is configured to be guided by the instructions to carry out the step of:

actuating a forced shutdown of one or more network communications devices in a network connecting the one or more computing devices by actuating at least one or more shutdown switches, wherein actuation of the at least one or more shutdown switches shuts off power to at least one or more of the one or more network communications devices.

5. The ransomware mitigation system as claimed in claim 1, wherein the processor is configured to be guided by the instructions to carry out the step of:

determining the network location of the computing devices on which the rate of file modification has exceeded the threshold (the "affected computing devices").

6. The ransomware mitigation system as claimed in claim 1, wherein the ransomware mitigation system includes a hardware lock.

7. The ransomware mitigation system as claimed in claim 6, wherein the hardware lock is configured for being operated by a hardware key between an unlocked condition; and a locked condition.

8. The ransomware mitigation system as claimed in claim 7, wherein the processor is configured to be guided by the instructions to carry out the step of:

receiving a request for modification of the system files of the ransomware mitigation system;

determining whether the hardware lock is in its unlocked condition; and only allowing the processing of the request for modification of the system files of the ransomware mitigation system in the event that the hardware lock is in its unlocked condition.

9. The ransomware mitigation system as claimed in claim 1, wherein the shutdown switch includes a shutdown switch transceiver configured for communicating with one or more selected from the monitoring transceiver and with one or more shutdown switch transceivers on other similar shutdown switches.

10. The ransomware mitigation system as claimed in claim 9, wherein the shutdown switch transceiver is configured for communicating with one or more selected from the monitoring transceiver and with one or more shutdown switch transceivers on other similar shutdown switches on a network independent of the network that the computing devices are connected to.

11. The ransomware mitigation system as claimed in claim 9, wherein the shutdown switch transceiver is configured for receiving an actuation signal from the monitoring transceiver.

12. The ransomware mitigation system as claimed in claim 11, wherein the shutdown switch is configured to open and close or close one or more electrical circuits on receiving the actuation signal.

13. The ransomware mitigation system as claimed in claim 9, wherein the shutdown switch transceiver is configured for receiving a synchronised confirmation signal from the monitoring transceiver at regular intervals.

14. The ransomware mitigation system as claimed in claim 13, wherein the shutdown switch is configured for opening and/or closing the electrical circuit in the event that a confirmation signal is not received at an expected interval.

15. The ransomware mitigation system as claimed in claim 13, wherein the shutdown switch is configured for opening and/or closing the electrical circuit in the event that a confirmation signal is not received continuously.

16. The ransomware mitigation system as claimed in claim 1, wherein the shutdown switch includes a switch processor and switch digital storage media configured for storing one or more selected from data and software instructions, and the switch processor is configured for being directed by the switch software instructions to open and/or close the electrical circuit at a switching device configured for switching one or more selected from:

a power connection to the one or more computing devices; and a network connection of the one or more computing devices.

17. A method of mitigating damage done to one or more computing devices on a network connection from a ransomware attack, the method being carried out on an electronic device and comprising the steps of:

Monitoring, by a monitoring portion, a plurality of digital files on a network of at least one or more computing devices for the rate of modifications carried out on the plurality of digital files in order to determine whether the monitored rate of modifications meets a predetermined activity threshold;

and maintaining bidirectional synchronous communication between the monitoring portion and at least one shut down switch on a dedicated communications line on a network independent of the network traffic on the network that the at least one or more computing devices are connected to by sending confirmation signals between the monitoring portion and the shutdown switch; and in the event of the shutdown switch not receiving an expected confirmation signal as part of the bidirectional synchronous communication between the at least one or more shutdown switches and the monitoring portion, actuating by the shutdown switch of one or more selected from:

a forced shutdown of the one or more computing devices; and a forced disconnection of the network connection of the one or more computing devices.

18. The ransomware mitigation system as claimed in claim 1, wherein the monitoring portion is configured to actuate a shutdown event in at least one of the at least one or more shutdown switches upon determining that the monitored rate of modifications meets a predetermined activity threshold.

19. A tamper prevention system for preventing the likelihood of tampering with a ransomware mitigation system by ransomware, the tamper prevention system comprising:

a monitoring portion configured for monitoring activities relating to one or more files on at least one or more computing devices;

a switching device configured for shutting down, in a shutdown event, one or more selected from:

power to the at least one or more computing devices, and network communications with the at least one or more computing devices; and wherein the switching device and the monitoring portion are configured for bidirectional synchronous communication with each other on a network independent of the network traffic on the network that the one or more computing devices are connected to, and wherein at least one or more selected from the switching device and the monitoring portion are configured for actuating a shutdown event in the event that synchronous communication between the monitoring portion and the switching device is not synchronized.

* * * * *